US011523409B2

(12) United States Patent
Krishnaswamy et al.

(10) Patent No.: US 11,523,409 B2
(45) Date of Patent: Dec. 6, 2022

(54) CHANNEL RESOURCE ALLOCATION IN A CLOUD RADIO ACCESS NETWORK

(71) Applicant: CommScope Technologies LLC, Hickory, NC (US)

(72) Inventors: Vijayaraghavan Krishnaswamy, Bengaluru (IN); Kesava Rao Vetapalem, Bengaluru (IN); Swami Rangaiah Damerla, Giddalur (IN); Prashant D Paraddi, Bangalore (IN); Pavan Kulkarni, Bangalore (IN)

(73) Assignee: CommScope Technologies LLC, Hickory, NC (US)

( * ) Notice: Subject to any disclaimer, the term of this patent is extended or adjusted under 35 U.S.C. 154(b) by 78 days.

(21) Appl. No.: 16/705,088

(22) Filed: Dec. 5, 2019

(65) Prior Publication Data

US 2020/0245344 A1 Jul. 30, 2020

Related U.S. Application Data

(60) Provisional application No. 62/796,928, filed on Jan. 25, 2019.

(51) Int. Cl.
*H04W 72/12* (2009.01)
*H04L 5/00* (2006.01)
(Continued)

(52) U.S. Cl.
CPC ....... *H04W 72/1252* (2013.01); *H04L 5/0005* (2013.01); *H04L 5/0035* (2013.01);
(Continued)

(58) Field of Classification Search
CPC ......... H04W 72/1252; H04W 72/0453; H04W 28/08; H04L 5/005; H04L 5/0035; H04L 5/0053
See application file for complete search history.

(56) References Cited

U.S. PATENT DOCUMENTS 10,064,072 B2 8/2018 Eyuboglu et al.
2011/0286436 A1* 11/2011 Suzuki .................. H04L 5/0048
370/336
(Continued)

FOREIGN PATENT DOCUMENTS

WO 2016176843 A1 11/2016

OTHER PUBLICATIONS

International Searching Authority, "International Search Report and Written Opinion from PCT Application No. PCT/US2019/064781", from Foreign Counterpart to U.S. Appl. No. 16/705,088, filed May 20, 2020, pp. 1 through 11, Published: WO.

(Continued)

*Primary Examiner* — Kevin C. Harper
(74) *Attorney, Agent, or Firm* — Fogg & Powers LLC

(57) ABSTRACT

A communication system for performing non-DRX-aware channel resource allocation is described. The communication system includes a plurality of radio points (RPs), each configured to exchange radio frequency (RF) signals with a plurality of user equipment (UEs) at a site. The communication system also includes a baseband controller communicatively coupled to the plurality of radio points. The baseband controller is configured to determine, for each RP communicating with a UE, available channel resources in each of a plurality of subframes. The baseband controller is also configured to determine a least-loaded subframe that has the most available channel resources. The baseband controller is also configured to assign an available channel resource in the least-loaded subframe to the UE.

21 Claims, 16 Drawing Sheets

(51) Int. Cl.
  *H04W 72/04* (2009.01)
  *H04W 28/08* (2009.01)
  *H04W 76/28* (2018.01)
  *H04W 74/08* (2009.01)
  *H04W 16/10* (2009.01)

(52) U.S. Cl.
  CPC .......... *H04L 5/0053* (2013.01); *H04W 28/08* (2013.01); *H04W 72/0446* (2013.01); *H04L 5/001* (2013.01); *H04L 5/0094* (2013.01); *H04W 16/10* (2013.01); *H04W 72/0413* (2013.01); *H04W 72/0453* (2013.01); *H04W 72/1257* (2013.01); *H04W 74/0816* (2013.01); *H04W 76/28* (2018.02)

(56) References Cited

U.S. PATENT DOCUMENTS

| | | | |
|---|---|---|---|
| 2012/0300635 A1 | 11/2012 | Jersenius et al. | |
| 2013/0150113 A1* | 6/2013 | Alamshahi | H04W 52/40 455/517 |
| 2014/0254509 A1* | 9/2014 | Chen | H04L 5/0058 370/329 |
| 2015/0055633 A1 | 2/2015 | Wu et al. | |
| 2015/0063262 A1 | 3/2015 | Ji et al. | |
| 2015/0117276 A1 | 4/2015 | Hu et al. | |
| 2016/0037550 A1* | 2/2016 | Barabell | H04W 72/046 455/450 |
| 2017/0265175 A1* | 9/2017 | Gandhi | H04W 76/20 |
| 2017/0373731 A1* | 12/2017 | Guo | H04B 7/0404 |

OTHER PUBLICATIONS

International Searching Authority, "Invitation to Pay Additional Fees and, Where Applicable, Protest Fee from PCT Application No. PCT/US2019/064781", from Foreign Counterpart to U.S. Appl. No. 16/705,088, filed Mar. 31, 2020, pp. 1 through 7, Published: WO.

LG Electronics, "Discussion on power saving for DRX operation", 3GPP TSG RAN WG1 Meeting #95, Nov. 2018, pp. 1 through 4, LG Electronics.

European Patent Office, "Extended European Search Report from EP Application No. 19911451.3", from Foreign Counterpart to U.S. Appl. No. 16/705,088, dated Jul. 5, 2022, pp. 1 through 37, Published: EP.

* cited by examiner

| DRX-aware Per RP – PUCCH resource table (max 12-bits each). [FFF means all available, 0 means all used up] ||||||||||||||||||||||
|---|---|---|---|---|---|---|---|---|---|---|---|---|---|---|---|---|---|---|---|---|---|
| Sub-Cycle | RP\SF | 0 | 1 | 2 | 3 | 4 | 5 | 6 | 7 | 8 | 9 | 10 | 11 | 12 | 13 | 14 | 15 | 16 | 17 | 18 | 19 |
| 1 (for SF1 to SF20) | RP1 | 1 | C | E | E | FFF | 0 | 0 | 0 | 0 | 0 | 0 | 0 | 0 | 0 | 23 | 0 | 0 | 0 | 26 | FF |
| | RP2 | 0 | 0 | FFE | E | 0 | 7F3 | 0 | 7 | 7F | EF | 8 | E0 | 4 | 7 | 8 | 6 | 4 | 83 | 8 | 0 |
| | RP3 | 0 | 0 | 0 | 0 | FFF | 0 | 4 | 0 | C | 4 | C0 | 2 | D0 | 4 | 10 | 4 | 45 | 25 | 4C | FF0 |
| | RP32 | FFC | 0 | 234 | 0 | FFF | 523 | 0 | 0 | 129 | 7 | 7 | 75 | 9 | FFF | D | E | 7 | 9 | 5 | 31 |
| | RP\SF | 20 | 21 | 22 | 23 | 24 | 25 | 26 | 27 | 28 | 29 | 30 | 31 | 32 | 33 | 34 | 35 | 36 | 37 | 38 | 39 |
| 2 (for SF21 to SF40) | RP1 | 1 | C | 0 | E | FFF | 0 | 0 | 0 | 0 | 0 | 0 | 0 | 0 | 0 | 23 | 0 | 0 | 0 | 26 | FF |
| | RP2 | 0 | 0 | FFE | E | 0 | 7F3 | 0 | 7 | 7F | EF | 8 | E0 | 4 | 7 | 8 | 6 | 4 | 83 | 8 | 0 |
| | RP3 | 0 | 0 | 0 | 0 | FFF | 0 | 4 | 0 | C | 4 | C0 | 2 | D0 | 4 | 10 | 4 | 45 | 25 | 4C | FF0 |
| | RP32 | FFC | 0 | 234 | 0 | FFF | 523 | 0 | 0 | 129 | 7 | 7 | 75 | 9 | FFF | D | E | 7 | 9 | 5 | 31 |
| | RP\SF | 40 | 41 | 42 | 43 | 44 | 45 | 46 | 47 | 48 | 49 | 50 | 51 | 52 | 53 | 54 | 55 | 56 | 57 | 58 | 59 |
| 3 (for SF41 to SF60) | RP1 | 1 | C | 0 | E | FFF | 0 | 0 | 0 | 0 | 0 | 0 | 0 | 0 | 0 | 23 | 0 | 0 | 0 | 26 | FF |
| | RP2 | 0 | 0 | FFE | E | 0 | 7F3 | 0 | 7 | 7F | EF | 8 | E0 | 4 | 7 | 8 | 6 | 4 | 83 | 8 | 0 |
| | RP3 | 0 | 0 | 0 | 0 | FFF | 0 | 4 | 0 | C | 4 | C0 | 2 | D0 | 4 | 10 | 4 | 45 | 25 | 4C | FF0 |
| | RP32 | FFC | 0 | 234 | 0 | FFF | 523 | 0 | 0 | 129 | 7 | 7 | 75 | 9 | FFF | D | E | 7 | 9 | 5 | 31 |
| | RP\SF | 60 | 61 | 62 | 63 | 64 | 65 | 66 | 67 | 68 | 69 | 70 | 71 | 72 | 73 | 74 | 75 | 76 | 77 | 78 | 79 |
| 4 (for SF61 to SF80) | RP1 | 1 | C | 0 | E | FFF | 0 | 0 | 0 | 0 | 0 | 0 | 0 | 0 | 0 | 23 | 0 | 0 | 0 | 26 | FF |
| | RP2 | 0 | 0 | FFE | E | 0 | 7F3 | 0 | 7 | 7F | EF | 8 | E0 | 4 | 7 | 8 | 6 | 4 | 83 | 8 | 0 |
| | RP3 | 0 | 0 | 0 | 0 | FFF | 0 | 4 | 0 | C | 4 | C0 | 2 | D0 | 4 | 10 | 4 | 45 | 25 | 4C | FF0 |
| | RP32 | FFC | 0 | 234 | 0 | FFF | 523 | 0 | 0 | 129 | 7 | 7 | 75 | 9 | FFF | D | E | 7 | 9 | 5 | 31 |

FIG. 6A

| DRX-aware Per RP – PUCCH resource table (max 12-bits each). [FFF means all available, 0 means all used up] | | | | | | | | | | | | | | | | | | | | | |
|---|---|---|---|---|---|---|---|---|---|---|---|---|---|---|---|---|---|---|---|---|---|
| Sub-Cycle | RP\SF | 0 | 1 | 2 | 3 | 4 | 5 | 6 | 7 | 8 | 9 | 10 | 11 | 12 | 13 | 14 | 15 | 16 | 17 | 18 | 19 |
| 1 (for SF1 to SF20) | RP1 | 1 | C | E | E | FFF | 0 | 0 | 0 | 0 | 0 | 0 | 0 | 0 | 0 | 23 | 0 | 0 | 0 | 26 | FF |
| | RP2 | 0 | 0 | FFE | E | 0 | 7F3 | 0 | 7 | 7F | EF | 8 | E0 | 4 | 7 | 8 | 6 | 4 | 83 | 8 | 0 |
| | RP3 | 0 | 0 | 0 | 0 | FFF | 0 | 4 | 0 | C | 4 | C0 | 2 | D0 | 4 | 10 | 4 | 45 | 25 | 4C | FF0 |
| | RP32 | FFC | 0 | 234 | 0 | FFF | 523 | 0 | 0 | 129 | 7 | 7 | 75 | 9 | FFF | D | E | 7 | 9 | 5 | 31 |
| | RP\SF | 20 | 21 | 22 | 23 | 24 | 25 | 26 | 27 | 28 | 29 | 30 | 31 | 32 | 33 | 34 | 35 | 36 | 37 | 38 | 39 |
| 2 (for SF21 to SF40) | RP1 | 1 | C | 0 | E | FFF | 0 | 0 | 0 | 0 | 0 | 0 | 0 | 0 | 0 | 23 | 0 | 0 | 0 | 26 | FF |
| | RP2 | 0 | 0 | FFE | E | 0 | 7F3 | 0 | 7 | 7F | EF | 8 | E0 | 4 | 7 | 8 | 6 | 4 | 83 | 8 | 0 |
| | RP3 | 0 | 0 | 0 | 0 | FFF | 0 | 4 | 0 | C | 4 | C0 | 2 | D0 | 4 | 10 | 4 | 45 | 25 | 4C | FF0 |
| | RP32 | FFC | 0 | 234 | 0 | FFF | 523 | 0 | 0 | 129 | 7 | 7 | 75 | 9 | FFF | D | E | 7 | 9 | 5 | 31 |
| | RP\SF | 40 | 41 | 42 | 43 | 44 | 45 | 46 | 47 | 48 | 49 | 50 | 51 | 52 | 53 | 54 | 55 | 56 | 57 | 58 | 59 |
| 3 (for SF41 to SF60) | RP1 | 1 | C | 0 | F | FFF | 0 | 0 | 0 | 0 | 0 | 0 | 0 | 0 | 0 | 23 | 0 | 0 | 0 | 26 | FF |
| | RP2 | 0 | 0 | FFE | F | 0 | 7F3 | 0 | 7 | 7F | EF | 8 | E0 | 4 | 7 | 8 | 6 | 4 | 83 | 8 | 0 |
| | RP3 | 0 | 0 | 0 | 1 | FFF | 0 | 4 | 0 | C | 4 | C0 | 2 | D0 | 4 | 10 | 4 | 45 | 25 | 4C | FF0 |
| | RP32 | FFC | 0 | 234 | 0 | FFF | 523 | 0 | 0 | 129 | 7 | 7 | 75 | 9 | FFF | D | E | 7 | 9 | 5 | 31 |
| | RP\SF | 60 | 61 | 62 | 63 | 64 | 65 | 66 | 67 | 68 | 69 | 70 | 71 | 72 | 73 | 74 | 75 | 76 | 77 | 78 | 79 |
| 4 (for SF61 to SF80) | RP1 | 1 | C | 0 | F | FFF | 0 | 0 | 0 | 0 | 0 | 0 | 0 | 0 | 0 | 23 | 0 | 0 | 0 | 26 | FF |
| | RP2 | 0 | 0 | FFE | F | 0 | 7F3 | 0 | 7 | 7F | EF | 8 | E0 | 4 | 7 | 8 | 6 | 4 | 83 | 8 | 0 |
| | RP3 | 0 | 0 | 0 | 1 | FFF | 0 | 4 | 0 | C | 4 | C0 | 2 | D0 | 4 | 10 | 4 | 45 | 25 | 4C | FF0 |
| | RP32 | FFC | 0 | 234 | 0 | FFF | 523 | 0 | 0 | 129 | 7 | 7 | 75 | 9 | FFF | D | E | 7 | 9 | 5 | 31 |

FIG. 6B

| Sub-Cycle | RP\SF | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|
| 1 (for SF1 to SF159) | RP1 | 1 | C | E | F | FFF | 0 | 0 | 0 | 0 | 0 | 0 | 0 | 0 | 0 | 23 | 0 | 0 | 0 | 27 | FF |
| | RP32 | 0 | 0 | 0 | 0 | FFF | 0 | 4 | 0 | C | 4 | C0 | 2 | D0 | 4 | 10 | 4 | 45 | 25 | 4D | FF0 |
| 2 (for SF160 to SF239) | RP1 | | | | | | | | | 0 | 0 | 0 | 0 | 0 | 0 | 23 | 0 | 0 | 0 | 27 | FF |
| | RP32 | | | | | | | | | C | 4 | C0 | 2 | D0 | 4 | 10 | 4 | 45 | 25 | 4D | FF0 |
| 3 (for SF240 to SF479) | RP1 | | | | | | | | | 0 | 0 | 0 | 0 | 0 | 0 | 23 | 0 | 0 | 0 | 27 | FF |
| | RP32 | | | | | | | | | C | 4 | C0 | 2 | D0 | 4 | 10 | 4 | 45 | 25 | 4D | FF0 |
| 4 (for SF480 to SF639) | RP1 | | | | | | | | | 0 | 0 | 0 | 0 | 0 | 0 | 23 | 0 | 0 | 0 | 27 | FF |
| | RP32 | | | | | | | | | C | 4 | C0 | 2 | D0 | 4 | 10 | 4 | 45 | 25 | 4D | FF0 |

FIG. 8

CHANNEL RESOURCE ALLOCATION IN A CLOUD RADIO ACCESS NETWORK

CROSS-REFERENCE TO RELATED APPLICATIONS

This application claims the benefit of U.S. Provisional Patent Application Ser. No. 62/796,928 filed on Jan. 25, 2019, entitled "CHANNEL RESOURCE ALLOCATION IN A CLOUD RADIO ACCESS NETWORK", the entirety of which is incorporated herein by reference.

BACKGROUND

Distributed base stations (such as cloud radio access networks (C-RANs)) may utilize multiple, geographically-separated radio points to provide wireless service to wireless devices in a coverage area. It may be beneficial to efficiently allocate channel resources (e.g., PUCCH resources) to wireless devices communicating with the C-RAN.

SUMMARY

A communication system for performing non-DRX-aware channel resource allocation is described. The communication system includes a plurality of radio points (RPs), each configured to exchange radio frequency (RF) signals with a plurality of user equipment (UEs) at a site. The communication system also includes a baseband controller communicatively coupled to the plurality of radio points. The baseband controller is configured to determine, for each RP communicating with a UE, available channel resources in each of a plurality of subframes. The baseband controller is also configured to determine a least-loaded subframe that has the most available channel resources. The baseband controller is also configured to assign an available channel resource in the least-loaded subframe to the UE.

A communication system for performing DRX-aware channel resource allocation is also described. The communication system includes a plurality of radio points (RPs), each configured to exchange radio frequency (RF) signals with a plurality of user equipment (UEs) at a site. The communication system also includes a baseband controller communicatively coupled to the plurality of radio points. The baseband controller is configured to reallocate a second UE's channel resource in a first UE's DRX subcycle, for RPs in a first UE's combining zone vector (CZV), from a second UE to a first UE, wherein the first UE's CZV matches the second UE's CZV.

A communication system for performing partial DRX-aware channel resource allocation is also described. The communication system includes a plurality of radio points (RPs), each configured to exchange radio frequency (RF) signals with a plurality of user equipment (UEs) at a site. The communication system also includes a baseband controller communicatively coupled to the plurality of radio points. The baseband controller is configured to allocate a channel resource to each of at least one first UE in a first set of subframes using non-DRX-aware channel resource allocation. The baseband controller is also configured to, in response to the system load meeting or exceeding a threshold, allocate a channel to each at least one second UE in a second set of subframes using non-DRX-aware channel resource allocation and DRX-aware channel resource allocation.

DRAWINGS

Understanding that the drawings depict only exemplary configurations and are not therefore to be considered limiting in scope, the exemplary configurations will be described with additional specificity and detail through the use of the accompanying drawings, in which:

FIG. 6A is a table illustrating an example of a DRX-aware, per-RP PUCCH resource table;

FIG. 6B is a table illustrating another example of a DRX-aware, per-RP PUCCH resource table;

FIG. 8 is a table illustrating another example of a partial DRX-aware, per-RP PUCCH resource table.

Figure 1A:
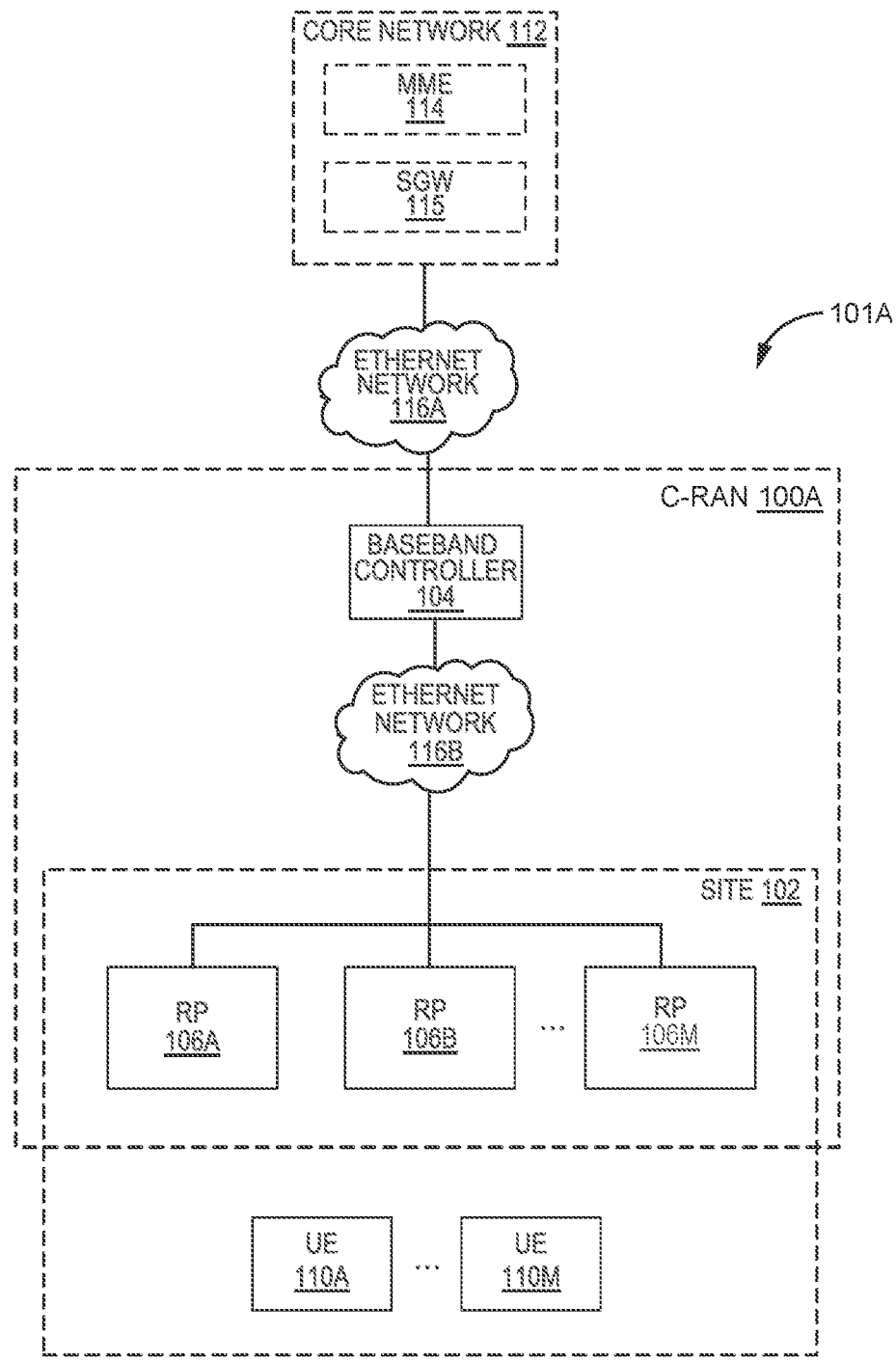
FIG. 1A is a block diagram illustrating an exemplary configuration of a system implementing channel resource allocation in a C-RAN.

In accordance with common practice, the various described features are not drawn to scale but are drawn to emphasize specific features relevant to the exemplary configurations.

DETAILED DESCRIPTION

The term Radio Access Network (RAN) refers to the part of a mobile communication network that connects wireless devices to the fixed network infrastructure through wireless radio channels, over specific radio frequencies. A cloud radio access network (C-RAN) is a point-to-multipoint distributed base station with one or more baseband controllers that are physically separated from, and communicatively coupled to, multiple radio points (RPs). In 5G examples, an RP can be a mix of a Digital Unit (DU) and a Radio Unit (RU).

In a C-RAN, the Layer-1 baseband processing may be split between a baseband controller unit and a set of up to X (e.g., 32, 64, etc.) remote radio-points (RPs). For example, an RP may be deployed for every 50,000 square feet of unhindered area. Alternatively, an RP may be deployed for every 5,000 square feet of area for in-building coverage cases. In deployments using external RPs, the RPs may be used along with external antennas to direct/focus the antenna coverage over specific direction/areas. The system capacity of a C-RAN may be determined using various factors, including the number of RPs, bandwidth used, reuse levels used, etc. (where reuse refers to PRB resources being reused for different UEs at the same time/subframe across different RPs located in different geographical locations).

Wireless devices communicate with the C-RAN (via RPs) using communication channels. Conventional fixed reservations of channel resources may consider the overall system (e.g., eNodeB) capacity but do not account for the geographical location diversity and the resulting physical resource block (PRB) reuse possibilities for the physical channels.

Accordingly, the present systems and methods describe smart scaling for the PUCCH channel. For example, a channel (e.g., PUCCH) resource allocation mechanism is described in which channel resources on a least-loaded subframe (among RPs communicating with the wireless device) are allocated to a wireless device. As another example, a discontinuous reception (DRX)-aware channel resource mechanism is also described in which channel resources during the wireless device's DRX-on subframes are allocated to the wireless device, while channel resources during the wireless device's DRX-silent subframes are allocated to a different wireless device.

These channel resource allocation mechanisms may minimize channel resources consumed by a wireless device to which a C-RAN is providing wireless service. These channel resource allocation mechanisms may also increase the overall scaling/capacity numbers of the C-RAN, e.g., to enable a C-RAN to provide wireless service more wireless devices.

In the context of channel resources, the terms "allocate," "assign," and "block" (and their variants) may be used interchangeably herein. Similarly, the terms "release," "free up" or "de-allocate" (and their variants) may be used interchangeably herein.

Overview of a C-RAN Architecture

FIG. 1A is a block diagram illustrating an exemplary configuration of a system 101A implementing channel resource allocation in a C-RAN 100A. The system 101A may provide wireless service/coverage and capacity for one or more wireless network operators. As used herein, the term "system" may, without limitation, refer to a C-RAN 100A, an RP 106, a group of RPs 106.

In the exemplary configuration shown in FIG. 1A, the C-RAN 100A may utilize a point-to-multipoint distributed base station architecture that employs at least one (and optionally multiple) baseband unit 104 and multiple radio points (RPs) 106A-M that serve at least one cell. The C-RAN 100A may also be referred to herein as a "C-RAN system," and/or an "eNodeB" (or "eNodeB"). The baseband unit 104 is also referred to herein as a "baseband controller" 104, just a "controller" 104, or "CU" 104. Each RP 106 may include or be coupled to at least one (e.g., two) antennas via which downlink RF signals are radiated to UEs 110A-M and via which uplink RF signals transmitted by UEs 110 are received. Furthermore, where an action is described as being performed by an eNodeB or a C-RAN 100A, it may be performed in the baseband controller 104 and/or at least one RP 106.

The RPs 106 and UEs 110 connected to (e.g., provided wireless service by) the C-RAN 100A may be located at a site 102. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). For example, the site 102 may be at least partially indoors, but other alternatives are possible.

It should be noted that the baseband controller 104 may or may not be located at the site 102 (with the RPs 106). For example, the baseband controller 104 may be physically located remotely from the RPs 106 (and the site 102) in a centralized bank of baseband controllers 104. Additionally, the RPs 106 are preferably physically separated from each other within the site 102, although they are each communicatively coupled to the baseband controller 104.

Each UE 110 may be a computing device with a processor that executes instructions stored in memory, e.g., a mobile phone, tablet computer, mobile media device, mobile gaming device, laptop computer, vehicle-based computer, a desktop computer, etc. It should be noted that any number of UEs 110 (e.g., M=1-1,000) may be present at the site 102.

The C-RAN 100A may be coupled to the core network 112 of each wireless network operator over an appropriate back-haul ETHERNET network 116A. For example, the Internet may be used for back-haul between the system 101A and each core network 112. However, it is to be understood that the back-haul ETHERNET network 116A can be implemented in other ways. The ETHERNET networks 116 described herein may be implemented with one or more switches, routers, and/or other networking devices.

In some configurations, the system 101A may be implemented as a Long Term Evolution (LTE) radio access network providing wireless service using an LTE air interface. However, it should be noted that the present systems and methods may be used with other wireless protocols, e.g., 5G. LTE is a standard defined by 3GPP standards organization. In the LTE configuration, the baseband controller 104 and RPs 106 together (C-RAN 100A) may be used to implement an LTE Evolved Node B (also referred to here as an "eNodeB" or "eNB"). An eNodeB may be used to provide UEs 110 with mobile access to the wireless network operator's core network 112 to enable UE 110 to wirelessly communicate data and voice (using, for example, Voice over LTE (VoLTE) technology).

Also, in an exemplary LTE configuration, each core network 112 may be implemented as an Evolved Packet Core (EPC) 112 comprising standard LTE EPC network elements such as, for example, a mobility management entity (MME) 114 and a Serving Gateway (SGW) 115 and, optionally, a Home eNodeB gateway (HeNodeB GW) (not shown) and a Security Gateway (SeGW) (not shown).

Moreover, in an exemplary LTE configuration, the baseband controller 104 may communicate with the MME 114 and SGW 115 in the EPC core network 112 using the LTE S1 interface and communicates with eNodeBs using the LTE X2 interface. For example, the baseband controller 104 can communicate with an outdoor macro eNodeB (not shown) via the LTE X2 interface.

The baseband controller 104 and radio points 106 can be implemented so as to use an air interface that supports one or more of frequency-division duplexing (FDD) and/or time-division duplexing (TDD). Also, the baseband controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the baseband controller 104 and the radio points 106 can implement one or more of the LTE transmission modes. Moreover, the baseband controller 104 and the radio points 106 can be configured to support multiple air interfaces and/or to support multiple wireless operators.

In the exemplary configurations shown in FIG. 1A, the front-haul that communicatively couples each baseband controller 104 to the one or more RPs 106 is implemented using a standard ETHERNET network 116B. However, it is to be understood that the front-haul between the baseband controller 104 and RPs 106 can be implemented in other ways.

Data can be front-hauled between the baseband controller 104 and RPs 106 in any suitable way (for example, using front-haul interfaces and techniques specified in the Common Public Radio Interface (CPRI) and/or Open Base Station Architecture Initiative (OBSAI) family of specifications).

Although not shown, a management system may be communicatively coupled to the baseband controller 104 and RPs 106, for example, via the ETHERNET network 116A and the ETHERNET network 116B (in the case of the RPs 106). The management system may send and receive management communications to and from the baseband controller 104, which in turn forwards relevant management communications to and from the RPs 106.

In Long Term Evolution (LTE) deployments, especially in-building coverage solutions, the main goal is to provide good coverage, e.g., above −90 dBm RSSI level in at least 95% coverage areas. This is achieved through small-cell solutions or through C-RAN solutions and/or macro base stations with distributed antenna system (DAS). The solutions may differ based on cost, quality of service, vendor, etc.

The Third Generation Partnership Project (3GPP) has adopted a layered model for the LTE radio access interface. Generally, the baseband controller 104 and/or RPs 106 perform analog radio frequency (RF) functions for the air interface as well as digital Layer-1 (L1), Layer-2 (L2), and/or Layer-3 (L3), of the 3GPP-defined LTE radio access interface protocol, functions for the air interface. In some configurations, the Layer-1 processing for the air interface may be split between the baseband controller 104 and the RPs 106, e.g., with L2-L3 functions for the air interface being performed at the baseband controller 104.

When a UE 110 attaches to the C-RAN 100A, its Random Access Channel (RACH) and Sounding Reference Signal (SRS) signals may be processed by all the RPs 106. The RPs 106 near the UE 110 receive the signals with good strength, while other RPs receive the signals with poor strength. The baseband controller 104 in the C-RAN 100A may determine the relative location of a UE 110 by ranking the signal strength of the wireless device's signal(s) across all RPs 106 and picking the top RPs 106 (e.g., the top three or four RPs 106) to be anchor RPs 106 for the UE 110. These "anchor" RPs 106 may be indicated in bit-format called "Combining Zone Vector" (CZV) for further processing. For example, a different CZV may be stored for each UE 110, which indicates the anchor RPs 106 transmitting to and/or receiving from (e.g., "communicating with") the respective UE 110.

In other words, a minimum combining zone may be represented by a CZV and may include a subset of RPs 106 in a C-RAN 100A that are used to transmit to a particular UE 110, e.g., each UE 110 may have a minimum combining zone that may or may not overlap with a minimum combining zone for another UE 110. A QSV for a UE 110 may be a vector that includes an element for each RP 106, where each element has one of a finite set of values. For example, the element for an RP 106 may have a first value (for example, a value of "1") if the RP 106 is included in the simulcast zone for that UE 110 and may have a second value (for example, a value of "0") if the RP 106 is not included in the simulcast zone for that UE 110. The CZV may be a subset of the QSV. In some configurations, two UEs 110 may be in frequency reuse (e.g., two UEs 110 use the same frequency resources) only if their CZVs are mutually orthogonal.

A UE's 110 CZV may be determined/updated throughout a UE's 110 session, even if the UE 110 moves across different RPs 106 in the C-RAN 100A. This process may be referred to as "location information tracking," and may be performed by at least the L2 layer of the baseband controller 104 in the C-RAN 100A.

PUCCH resources may be allocated when the UE 110 attaches to the C-RAN 100A. At the instance when a UE 110 triggers its SR and/or CQI signaling, the baseband controller 104 may command specific RPs 106 (e.g., based on the UE's 110 location information stored earlier, such as the CZV) to perform PUCCH channel decoding and CU-L1 (L1 processing on the baseband controller 104) may select the best results, which may be sent back to the CU-L2 (L2 processing on the baseband controller 104). This information may be further used for wireless device-specific uplink and downlink data scheduling.

Similarly, when a downlink packet is scheduled for a wireless device 104, four transmission time intervals (TTIs) later, the baseband controller 104 may command the specific RPs 106 (e.g., based on UE's 110 location information, such as the CZV) to process the UE's 110 HARQ acknowledgments. Those RPs 106 may then decode the channel and sends reports indicating whether the downlink packet is HARQ ACK/NACK/DTX. The CU-L1 (L1 processing on the baseband controller 104) may consolidate such reports and pass them on to CU-L2 (L2 processing on the baseband controller 104) for further scheduling decisions. A subframe (SF) may be equivalent to a TTI in some cases, e.g., 1 ms long.

Therefore, PUCCH HARQ, SR, and CQI processing may be used in (and in some cases be vital for) CU-L2 operations (L2 processing on the baseband controller 104).

Each C-RAN 100A may be budgeted to process a specific number of PUCCH-HARQ, PUCCH-SR, and/or PUCCH-CQI transmissions in every TTI, e.g., as part of overall dimensioning of the system. Each RP-L1 software may be configured to process a certain number of PUCCH-HARQ, PUCCH-SR, and/or PUCCH-CQI in every TTI. C-RAN-level numbers may be much higher than RP-specific numbers.

It should be noted that the present systems and methods may be used to allocate resources for any channel, not only PUCCH. Therefore, even though the description focuses on PUCCH resource management, the present systems and methods are generally applicable to eNodeB scheduling of different channels, e.g., SRS and even data channels. Furthermore, the present systems and methods may help in overload management and for striking a good balance between capacity and performance.

Figure 1B:
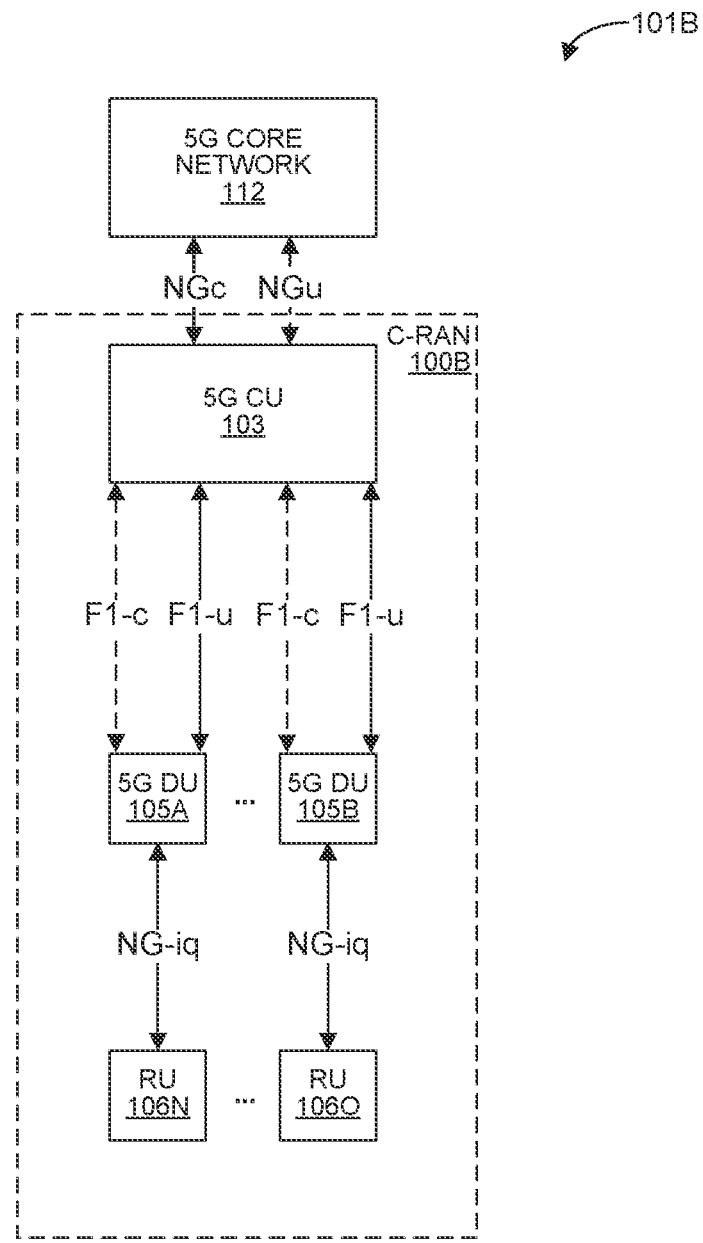
FIG. 1B is a block diagram illustrating another exemplary configuration of a system implementing channel resource allocation in a C-RAN.

FIG. 1B is a block diagram illustrating another exemplary configuration of a system 101B implementing channel resource allocation in a C-RAN 100B. The system 101B includes 3GPP Fifth Generation (5G) components. Optionally, the system 101B may additionally include 4G components. Each of the components may be implemented using at least one processor executing instructions stored in at least one memory. In some configurations, at least some of the components are implemented using a virtual machine.

Fifth Generation (5G) standards support a wide variety of applications, bandwidth, and latencies while supporting various implementation options. In the system 100, interfaces denoted with "-c" or simply "c" (illustrated with dashed lines) provide control plane connectivity, while interfaces denoted with "-u" or simply "u" (illustrated with solid lines) provide user plane connectivity. More explanation of the various devices and interfaces in FIG. 1B can be found in 3GPP TR 38.801 Radio Access Architecture and Interfaces, Release 14 (available at https://portal.3gpp.org/desktopmodules/Specifications/SpecificationDetails.aspx? specific ationId=3056), which is incorporated by reference herein.

FIG. 1B illustrates a C-RAN 100B implementing an example of a 5G Next Generation NodeB (gNB). The architecture of a Next Generation NodeB (gNB) is partitioned into a 5G Central Unit (CU) 103, one or more 5G Distributed Unit (DU) 105A-B and one or more 5G Remote Units (RU) 106N-O. A 5G Central Unit (CU) 103 is a node that includes the gNB controller functions such as the transfer of user data, mobility control, radio access network sharing, positioning, session management, etc. The 5G CU 103 controls the operation of the Distributed Units (DUs) 105A-B over an interface (including F1-c and F1-u for the control plane and user plane, respectively).

The Distributed Units (DUs) 105 may be nodes that implement a subset of the gNB functions, depending on the functional split (between CU 103 and DU 105). In some configurations, the L3 processing (of the 5G air interface) may be implemented in the CU 103 and the L2 processing (of the 5G air interface) may be implemented in the DU 105. The operation of each DU 105 is controlled by a CU 103. The functions of the DU 105 may include Radio Link Control (RLC), portions of Medium Access Control (MAC) and/or portions of the physical (PHY) layer functions. A Distributed Unit (DU) 105 can optionally offload some of its PHY (L1) processing (of the 5G air interface) to RUs 106.

In FIG. 1B, the C-RAN 100B implementing the example Next Generation NodeB (gNB) includes a single CU 103, which handles control plane functions and user plane functions. The 5G CU 103 (in the C-RAN 100B) may communicate with at least one wireless service provider's Next Generation Cores (NGC) 112 using 5G NGc and 5G NGu interfaces. In some 5G configurations (not shown), a 5G CU is split between a CU-C 103B that handles control plane functions and a CU-U 103C that handles user plane functions.

In some 5G configurations, the RUs (RUs) 106N-O may communicate baseband signal data to the DUs 105 on an NG-iq interface. In some 5G configurations, the RUs 106 may implement at least some of the L1 and/or L2 processing. In some configurations, the RUs 106 may have multiple ETHERNET ports and can communicate with multiple switches.

Any of the interfaces in FIG. 1B may be implemented using a switched ETHERNET (or fiber) network. Additionally, if multiple CUs 103 are present (not shown), they may communicate with each other using any suitable interface, e.g., an Xn (Xn-c and Xn-u) and/or X2 interface. A fronthaul interface may facilitate any of the NG-iq, F1-c, and/or F1-u interfaces in FIG. 1B.

Where functionality of a baseband controller 104 is discussed herein, it is equally applicable to a 5G CU 103 or 5G DU 105 in 5G configurations. Similarly, where functionality of an RP 106 is discussed herein, it is equally applicable to an RU 106 in 5G configurations. Therefore, where a C-RAN 100 is described herein, it may include 4G components (as in FIG. 1A) and/or 5G components (as in FIG. 1B).

PUCCH Overview

Figure 2A:
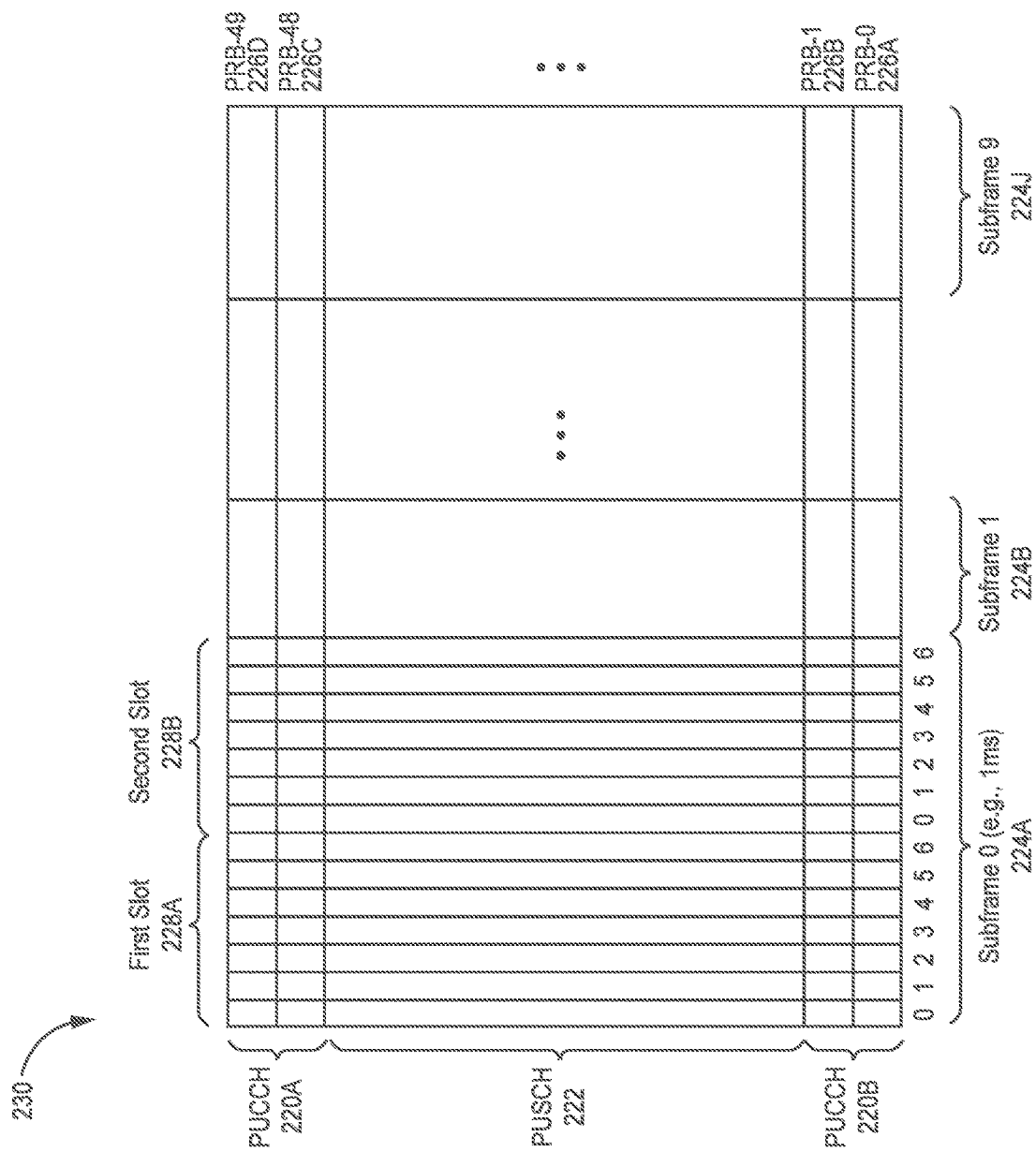
FIG. 2A is a block diagram illustrating an uplink system frame with a resource grid carrying the PUCCH and PUSCH within the assigned spectrum.

FIG. 2A is a block diagram illustrating an uplink system frame 230 with a resource grid carrying the PUCCH 220A-B and PUSCH 222 within the assigned spectrum. In FIG. 2A, the vertical axis is frequency (e.g., PRB-0 226A through PRB-49 226D) while the horizontal axis is time (e.g., subframe 0 224A through subframe 9 224J in a system frame 230). It should be noted that FIG. 2A is a 10 MHz per PRB example. Alternatively, in a 20 MHz example, PRB-0 through PRB-99 might be shown. Alternatively, in a 5 MHz example, PRB-0 through PRB-24 might be shown.

The PUCCH PRBs (e.g., PRB-0 226A, PRB-1 226B, PRB-48 226C, PRB-49 226D) are at the far-ends of the spectrum at opposing slots 228A-B in the same subframe 224 to provide frequency-diversity for the transmission. A number of PUSCH PRBs 222 may separate a first set of PUCCH PRBs 220A from a second set of PUCCH PRBs 220B.

It should be noted that the particular configuration illustrated in FIG. 2A is exemplary and should not be taken as limiting. For example, different combinations of PRBs 226 may be available and/or used for PUCCH 220 and PUSCH 222. Furthermore, other signaling may be sent in the PRBs 226 that is not shown, e.g., SRS, demodulation reference signals (for the PUCCH 220 and/or PUSCH), PRACH, etc. Additionally, a system frame 230 may include any number of subframes 224, and a subframe 224 may carry different number of symbols (even though 14 are shown here).

Figure 2B:
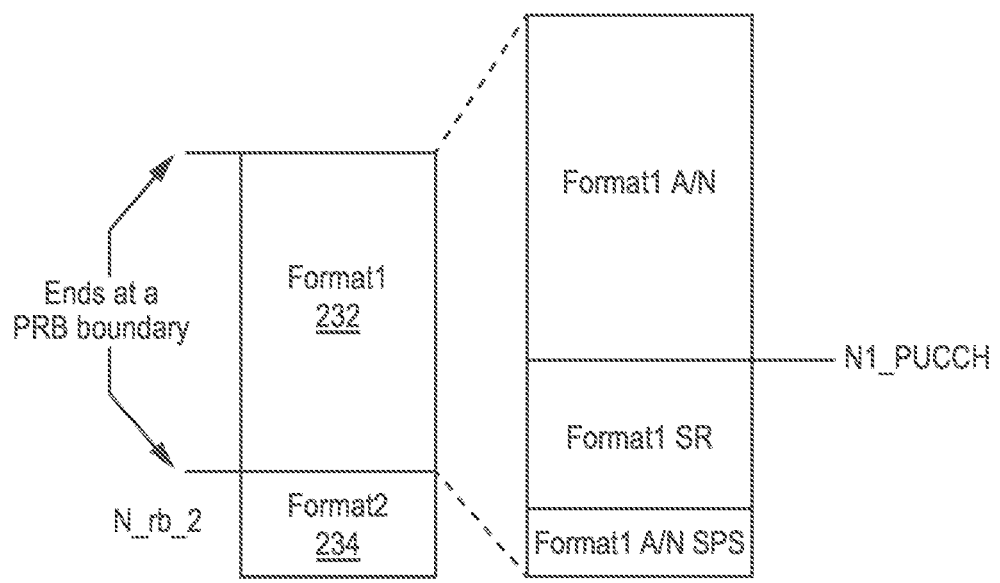
FIG. 2B is a block diagram illustrating PUCCH resources in a subframe with two slots.

FIG. 2B is a block diagram illustrating PUCCH Format 1 232 and Format 2 234. In PUCCH resource allocation, PUCCH Format 2 234 may be mapped first, followed by Format 1 232. The number of PRBs 226 occupied by the PUCCH may be derived based on N_rb_cqi and N1_PUCCH. There may be another split for Format 1 Ack/Nack semi-persistent scheduling (SPS) UEs within N_1_PUCCH.

Figure 2C:
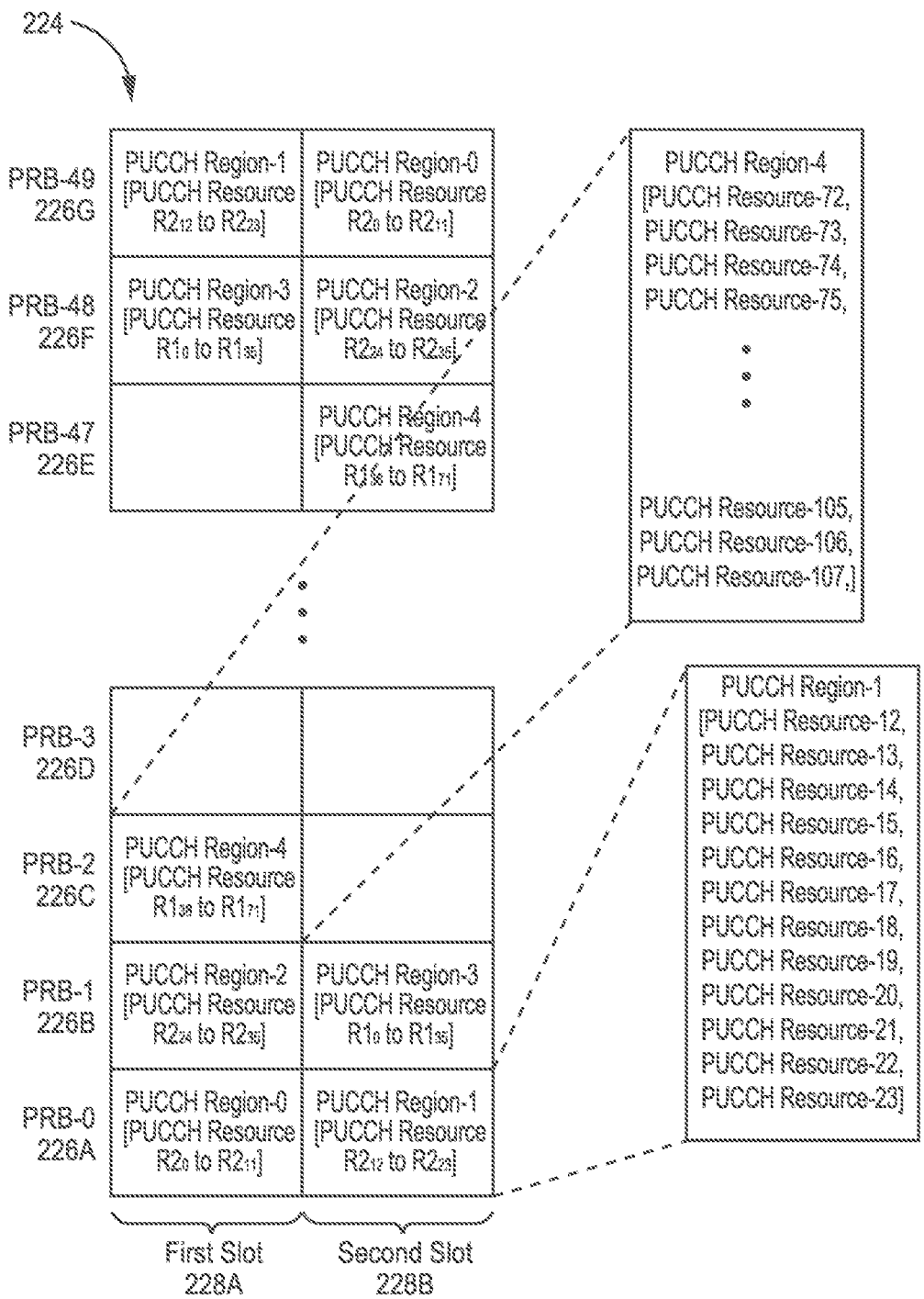
FIG. 2C is a block diagram illustrating PUCCH Format 1 and Format 2.

FIG. 2C is a block diagram illustrating PUCCH resources in a subframe 224 with two slots 228A-B. As used herein, a "resource" (e.g., PUCCH resource in this example) may be a combination of (1) a specific system frame 230 and subframe 224; (2) a PRB 226A-G within the subframe 224; (3) cyclic shift; and (4) an optional orthogonal sequence for Format-1 (resource-index) for its scheduling requests (SR) and channel quality indications (CQI) on the PUCCH channel. As before, the PUCCH PRBs 226 are at the far-ends of the spectrum at the opposite slots 228A-B in the same subframe 224 to provide frequency-diversity for the transmission. For example, both parts of the PUCCH Region 0 (in PRB-0 226A and in PRB-49 226G may carry all PUCCH resources for the UE 110, e.g., there may be no split of the PUCCH resources within a PUCCH region. The particular configuration illustrated in FIG. 2C is exemplary and should not be taken as limiting.

In FIG. 2C, more than one PRB 226 is used for Format-1 or Format-2. For example, PUCCH Regions 3-4 (and PUCCH resources $R1_0$-$R1_{71}$) are for Format 1, while PUCCH Regions 0-2 (and PUCCH resources $R2_0$-$R2_{35}$) are for PUCCH Format 2. The PUCCH may be used to transmit channel quality indications (CQI), scheduling requests (SRs), and/or hybrid automatic repeat request (HARD) messages from a UE 110. The parameter N_rb_cqi may indicate number of resource blocks (PRBs) used for CQI transmissions (in Format 2). The parameter N1 Pucch may indicate the number of PUCCH resources used for scheduling requests from the UE 110 (in Format 1). The parameter N1_cs may indicate whether mixed PUCCH format (Format 1/Format 2) is being used, e.g., N1_cs=0 indicates no mixing. The parameter DeltaShift may indicate the number of Format-1 UEs 110 that are being packed on the same PRB 226, e.g., DeltaShift=1 indicates that 36 UEs 110 in a single PRB 226; DeltaShift=2 indicates that 18 UEs 110 are being packed a single PRB 226; and DeltaShift=3 indicates that 12 UEs 110 are being packed a single PRB 226. Format-2 always uses 12 resources to multiplex 12 UEs in a single-PRB. N_rb_cqi, N1_cs, N1_PUCCH and DeltaShift may be broadcast in system information block (SIB) messages by the eNodeB, e.g., the C-RAN 100.

Capacity Planning

A discussion of capacity planning in a C-RAN 100 (e.g., a C-RAN 100 implementing an LTE eNodeB) follows. For 20 ms CQI (Format-2) periodicity for UEs 110, an eNodeB can support 20*12=240 UEs, by using 1 PRB 226 every ms/subframe 224. For supporting 1024 UEs with same periodicity, the eNodeB needs up to ceil[1024/(12*20)]=5 PRBs 226. For 20 ms SR (Format-1) periodicity for UEs 110, the eNodeB can support 20*36=720 UEs, by using 1 PRB every ms/subframe. For supporting 1024 UEs 110 with the same periodicity, the eNodeB needs up to ceil[1024/(36*20)]=2 PRBs. In addition, 2 PRBs 226 may be used for PUCCH-HARQ processing, e.g., the 3rd PRB may get used in some extreme conditions, depending on PDCCH CCE index used for earlier downlink scheduling. This means 5+2+2=9 PRBs 226 are to be reserved for PUCCH processing in this example.

To support 1024 UEs 110 and to reduce the number of PRBs 226 used for the PUCCH 220, a compromise solution is to use 40 ms or even 80 ms periodicity for CQI and SR. This has its own effect on delays for link-adaptation.

In one configuration of fixed reservations, to support up to 512 UEs 110, a C-RAN 100 may use N_rb_cqi=3 PRBs 226 for PUCCH Format-2, one PRB 226 for format-1 PUCCH-SR, and 1-2 additional PRBs 226 for Format-1 PUCCH HARQ. In this configuration 3+1+2=6 PRBs 226 are to be reserved for PUCCH. If N PRBs 226 are considered reserved/blocked for PUCCH 220 processing, then:

First, those N PRBs 226 are not available for PUSCH 222 processing in the RP 106, e.g., if N=6, this means 6% of PRBs 226 are reserved.

Next, when a C-RAN 100 is deployed in different bandwidth configurations, the total number of PRBs 226 available for uplink transmissions are 25, 50, 75, and 100 for 5 Mhz, 10 Mh, 15 Mhz, and 20 Mhz, respectively. To support the same number of capacity/users, if similar PRB 226 reservations are made for a 5 Mhz system, then the reserved PUCCH PRBs go up to (6)/(25) ~25% of available PRBs 226.

Therefore, in the fixed reservation example, many PRBs 226 are reserved for PUCCH 220 and are blocked from being used for PUSCH 222, thereby limiting the overall cell performance.

RP-Associated Smart Scaling

The fixed reservation of channel resources described above may consider the overall system (e.g., eNodeB) capacity but do not account for the geographical location diversity and the resulting PRB-reuse possibilities for the physical channels. Accordingly, the present systems and methods describe smart scaling for the PUCCH.

PUCCH parameters (e.g., N_rb_cqi, N1 Pucch, DeltaShift, etc.) may be broadcast on system-level signaling and, therefore, cannot frequently change in the presence of connected UEs 110. Accordingly, a minimum number of PRBs 226 may be utilized, reserved, and/or advertised (and generally remain the same). The following parameter values will be used in the discussion as an example: N_rb_cqi=1, N1_Pucch=12, DeltaShift=1, and N1_cs=0. At minimum, just 2 PUCCH PRBs 220 are used. With this, 12 UEs 110 may be supported for each TTI for CQI and SR, and additional resources are still available for PUCCH-HARQ processing.

These resources (e.g., PUCCH resources) may be blocked together for certain groups of RPs 106 and re-used in another set of RPs 106, which are geographically separated. However, when UEs 110 are in between multiple RPs 106, the baseband controller 104 in a C-RAN 100 may schedule the PUCCH processing on all the RPs 106 in the UE's 110 CZV (up to a max of 4 RPs 106), after which the baseband controller 104 may perform selection combining to pick the decode-result based on best SINR ratio reported by the RPs 106.

A per RP PUCCH resource table is maintained at every RP-level, instead of at eNodeB/C-RAN 100 level. The PUCCH config-index is simply referred as subframe offset [0 . . . 19] (instead of 3GPP standards value, which offsets them with a startIndex). The PUCCH resource-index is an index of PUCCH resources available on specific subframe along with a cyclic-shift and orthogonal-sequence combination, ranging from [0 . . . 11].

An eNodeB (e.g., C-RAN 100) may maintain a table with a PUCCH vector for every RP-subframe combination. In other words, the eNodeB (e.g., C-RAN 100) may maintain a list of PUCCH vectors for every RP 106, covering the resources used on each sub-frame (config-index). Table 1 below is an example for a configuration using 20 ms subframe:

TABLE 1

Per-RP PUCCH resource table (max 12-bits each)

| RP/SF | | | | | | | | | | |
|---|---|---|---|---|---|---|---|---|---|---|
| | 0 | 1 | 2 | 3 | 4 | 5 | 6 | 7 | 8 | 9 |
| $RP_1$ | 1 | C | E | E | FFF | 0 | 0 | 0 | 0 | 0 |
| $RP_2$ | 0 | 0 | FFD | E | 0 | 7F3 | 0 | 7 | 7F | EF |
| $RP_3$ | 0 | 0 | 0 | 0 | FFF | 0 | 4 | 0 | C | 4 |
| $RP_4$ | DE | AD | DD | 2 | 123 | FFF | 0 | 0 | BA | 2 |
| . . . | . . . | . . . | . . . | . . . | . . . | . . . | . . . | . . . | . . . | . . . |
| $RP_{32}$ | FFC | 0 | 234 | 0 | FFF | 523 | 0 | 0 | 129 | 7 |

| RP/SF | | | | | | | | | | |
|---|---|---|---|---|---|---|---|---|---|---|
| | 10 | 11 | 12 | 13 | 14 | 15 | 16 | 17 | 18 | 19 |
| $RP_1$ | 0 | 0 | 0 | 0 | 23 | 0 | 0 | 0 | 27 | FF |
| $RP_2$ | 8 | E0 | 4 | 7 | 8 | 6 | 4 | 83 | 9 | 0 |
| $RP_3$ | C0 | 2 | D0 | 4 | 10 | 4 | 45 | 25 | 4D | FF0 |
| $RP_4$ | FB | 18 | 6 | FC | 110 | 9 | 34 | 36 | 19 | 23 |
| . . . | . . . | . . . | . . . | . . . | . . . | . . . | . . . | . . . | . . . | . . . |
| $RP_{32}$ | 7 | 75 | 9 | FFF | D | E | 7 | 9 | 5 | 31 |

Each entry in Table 1 is a three digit hexadecimal value that is associated with a particular RP 106 and subframe 224. Therefore, the value "1" in Table 1 is more accurately denoted as "0x001".

Each element (also referred to as TTI mask) in Table 1 is shown to be a bitmap data structure (but other bitmap data structures can be used for the same, such as linked list, array, etc.) representing the multiplexed resource availability at each RP 106 at each TTI/subframe 224. In other words, each bit in each entry of Table 1 may represent a channel resource (e.g., PUCCH resource) on a RP/SF combination, e.g., 12 channel resources for each RP/SF. Therefore, "$RP_X/SF_Y$" is meant to denote an entry (TTI mask) for the Xth RP 106 in Yth subframe 224, showing the number of PUCCH channel resources available in the per-RP PUCCH resource table (or DRX-aware, per-RP PUCCH resource table described below), e.g., $RP_1/SF_4$ indicates that the TTI mask for $RP_1$ and $SF_4$ has a value of "FFF".

Using the example of Table 1, the present systems and methods can cater to a max of 20(TTI)*12(resources)=240 UEs 110 under an RP 106 (or group of RPs 106). In Table 1, "FFF" means all PUCCH resources for the indicated RP 106 and subframe 224 are available. Conversely, "0" means all PUCCH resources for the indicated RP 106 and subframe 224 are already reserved for UEs 110. In other words, a bit should be set to "1" in a particular TTI mask for each PUCCH resource that is available in the indicated RP 106 and subframe 224, while a bit should be set to "0" in a particular TTI mask for each PUCCH resource that is not available in the indicated RP 106 and subframe 224.

Channel Resource Allocation Mechanism (Non-DRX-Aware)

Figure 3:
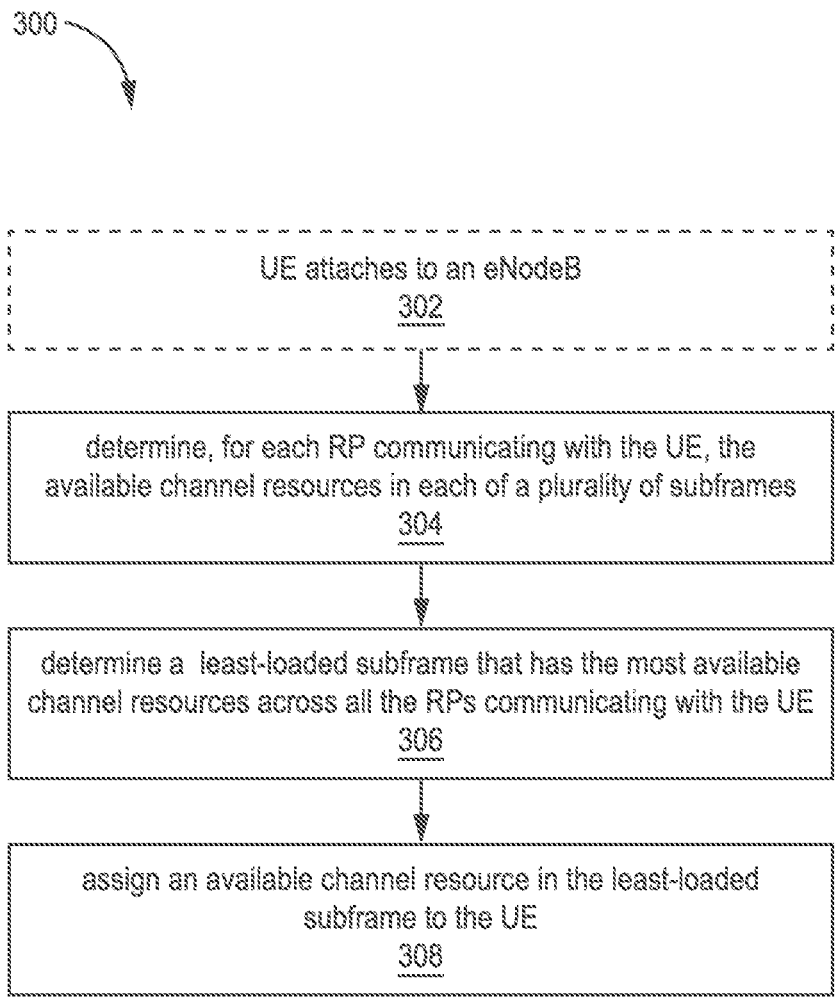
FIG. 3 is a flow diagram illustrating an exemplary method for allocating at least one channel resource in a C-RAN to a UE.

FIG. 3 is a flow diagram illustrating an exemplary method 300 for allocating at least one channel resource in a C-RAN 100 to a UE 110. Specifically, the method 300 illustrates non-DRX-aware channel resource allocation. The method 300 may be performed, at least partially, by an eNodeB, e.g., implemented by a C-RAN 100. In some examples, the method 300 may be performed by a baseband controller 104 in a C-RAN 100.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

The method 300 may begin at optional step 302 where the UE 110 (e.g., UE1) attaches to the eNodeB. The eNodeB (e.g., C-RAN 100) may use Table 1 to determine the best available TTI/subframe and resource-config. In other words, the eNodeB may assign channel resources (e.g., PUCCH resources) to the UE 110 based on Table 1. Optionally, the eNodeB may determine the CZV of the UE 110 before (or as part of) performing the method 300—$RP_1$ and $RP_3$ in this example.

The method 300 may proceed to step 304 where the eNodeB determines, for each RP 106 communicating with the UE 110, the available channel resources (e.g., PUCCH resources) in each of a plurality of subframes 224 (e.g., 20 subframes in Table 1). For example, the eNodeB may create a tmpMask data structure with an entry for every subframe 224, the value of which is the bitwise AND of the entries in Table 1 for RPs 106 in the UE's CZV. In other words, tmpMask may be determined by looping through every subframe 224 to prepare a per-TTI mask for that UE's CZV-RPs, e.g., as using Equation (1):

$$\text{tmpMask}[SF]=\text{RsrcTable}[SF].RP[UE.rp[i]].\text{mask} \ \& \ \text{RsrcTable}[SF].RP[UE.rp[i+1]].\text{mask} \quad (1)$$

where tmpMask[SF] is the tmpMask at subframe/index SF; RsrcTable[SF].RP[UE.rp[i]].mask is the TTI mask in Table 1 for subframe SF and the ith RP 106 in the UE's CZV ($RP_1$ in this example); and RsrcTable[SF].RP[UE.rp[i+1]].mask is the TTI mask in Table 1 for subframe SF and the i+1th RP 106 in the UE's CZV ($RP_3$ in this example). It should be noted that Equation (1) may include masks for each of the RPs 106 in the UE's 110 CZV, e.g., for RP[i+2], RP[i+3], etc.

For example, Table 2 is an example of a tmpMask data structure (for a UE 110 having a CZV with $RP_1$ and $RP_3$ from Table 1):

TABLE 2 tmpMask Data Structure

| | Subframe | | | | | | | | | |
|---|---|---|---|---|---|---|---|---|---|---|
| | 0 | 1 | 2 | 3 | 4 | 5 | 6 | 7 | 8 | 9 |
| tmpMask | 0 | 0 | 0 | 0 | FFF | 0 | 0 | 0 | 0 | 0 |

| | Subframe | | | | | | | | | |
|---|---|---|---|---|---|---|---|---|---|---|
| | 10 | 11 | 12 | 13 | 14 | 15 | 16 | 17 | 18 | 19 |
| tmpMask | 0 | 0 | 0 | 0 | 0 | 0 | 0 | 0 | 5 | 0F0 |

For example, "FFF" in subframe 4 may be determined using a bitwise AND of FFF (in $RP_1/SF_4$ in Table 1) and FFF (in $RP_3/SF_4$ in Table 1), e.g., since the UE's CZV includes $RP_1$ and $RP_3$ in this example. Similarly, "5" in subframe 18 may be determined using a bitwise AND of 27 (in $RP_1/SF_{18}$ in Table 1) and 4D (in $RP_3/SF_{18}$ in Table 1). Similarly, "0F0" in subframe 18 may be using a bitwise AND of FF (in $RP_1/SF_{19}$ in Table 1) and FF0 (in $RP_3/SF_{19}$ in Table 1). The "0" entries in Table 2 may also be determined using a bitwise AND between the $RP_1$ and $RP_3$ entries for a respective subframe 224 in Table 1.

The method 300 may proceed to step 306 where the eNodeB determines a least-loaded subframe 224 that has the most available channel resources (e.g., PUCCH resources) across all the RPs 106 communicating with the UE 110. In other words, the eNodeB may determine the least-loaded subframe 224 among RP(s) 106 in the UE's 110 CZV. The subframe 224 with the most available channel resources may be determined based on tmpMask. For example, this may include (1) counting the number of bits in each subframe 224 of tmpMask[SF]; (2) optionally sorting the elements based on their per-SF count; and (3) optionally preparing a sortList data structure with elements having the most number of bits set being at the head of the list. The subframe 224 with the most available channel resources may be determined based on the sortList, e.g., the subframe 224 associated with the element at the head of the list. An example sortList is shown in Table 3:

TABLE 3 sortList Data Structure

| LeastLoadedSubFrame-sortList | 4 | 19 | 18 | 0 | 0 | 0 | 0 | 0 | 0 | 0 |
|---|---|---|---|---|---|---|---|---|---|---|
| LeastLoadedSubFrame-sortList | 0 | 0 | 0 | 0 | 0 | 0 | 0 | 0 | 0 | 0 |

In the example sortList of Table 3, "4" is in the head of the sortList because subframe 4 has the highest count among entries in the tmpMask data structure, e.g., as shown in Table 2. Similarly, "19" and "18" are the second and third entries in example sortList of Table 3 because subframes 19 and 18 have the second and third highest counts, respectively, among entries in the tmpMask data structure, e.g., as shown in Table 2.

Alternatively, instead of creating a separate sortList data structure (e.g., as in Table 3), a second row may be added to the tmpMask data structure to rank the entries by their respective bit counts. For example, Table 4 is an example tmpMask with an added row:

TABLE 4 tmpMask Data Structure with Added sortList

| | Subframe | | | | | | | | | |
|---|---|---|---|---|---|---|---|---|---|---|
| | 0 | 1 | 2 | 3 | 4 | 5 | 6 | 7 | 8 | 9 |
| tmpMask | 0 | 0 | 0 | 0 | FFF | 0 | 0 | 0 | 0 | 0 |
| subFrameRankList | 0 | 0 | 0 | 0 | 1 | 0 | 0 | 0 | 0 | 0 |

| | Subframe | | | | | | | | | |
|---|---|---|---|---|---|---|---|---|---|---|
| | 10 | 11 | 12 | 13 | 14 | 15 | 16 | 17 | 18 | 19 |
| tmpMask | 0 | 0 | 0 | 0 | 0 | 0 | 0 | 0 | 5 | 0F0 |
| subFrameRankList | 0 | 0 | 0 | 0 | 0 | 0 | 0 | 0 | 3 | 2 |

As before, the entries in tmpMask for subframes 4, 19, and 18 have the first, second, and third most bits set to "1", respectively. The added subFrameRankList row in Table 4 reflects these rankings.

The method 300 may proceed to step 308 where the eNodeB may assign an available channel resource (e.g., PUCCH resources) in the least-loaded subframe 224 to the UE 110, e.g., for each RP 106 in the UE's CZV—$RP_1$ and $RP_3$ in this example. Optionally, this may include setting a bit for a newly-assigned channel resource (e.g., PUCCH resource) in each of the TTI masks (for the RPs 106 in the UE's CZV) to "0", as explained below.

For example, the eNodeB may first select the first entry in the sortList (e.g., subframe 4 in Table 3 or 4) and find the free resource bit available as: tmpAvail=ffs(tmpMask[SF])−1 (where ffs( ) is a function that determines the first least significant bit (LSB) that is set).

Next, based on tmpAvail, the eNodeB may reserve new channel resource allocation(s) for the UE 110. This may include clearing the bit indicated as blocked for the RPs 106 (in the UE's CZV) for those subframes 224. In other words, the eNodeB may set bits for channel resources that are newly-allocated to the UE 110 in Table 1 to "0" to indicate they are reserved for the UE 110. For example, the eNodeB may set bits for channel resources in $RP_1/SF_4$ and $RP_3/SF_4$ to "0" since they are being allocated to the UE 110, e.g., according to Equations (2) and (3):

RsrcTable[SF].RP[UE.rp[$i$]].mask &=~(1<<tmpAvail); (2)

RsrcTable[SF].RP[UE.rp[$i$+1]].mask &=~(1<<tmpAvail); (3)

where tmpAvail indicates the location of the bit that needs to be cleared in the TTI mask, e.g., if tmpAvail=0, then the first bit needs to be cleared in the TTI mask because it is no longer available for other UEs 110.

It should be noted that this example only shows channel resources being reserved for RP[i] and RP[i+1], but channel resources will be reserved for as many RPs 106 as are in the UE's CZV, e.g., a CZV with four RPs 106 means that there would be additional channel resources reserved for RP[i+2] and RP[i+3].

Next, the eNodeB may return (SF, tmpAvail) for this UE 110. For example, Table 5 is an example PUCCH resource table after assigning the UE 110 to subframe 4 on $RP_1$ and $RP_3$. In other words, Table 5 may be an updated form of Table 1 after assigning the UE 110 to subframe 4 on $RP_1$ and $RP_3$ (where the entries in $RP_1/SF_4$ and $RP_3/SF_4$ are changed from "FFF" in Table 1 to "FFE" in Table 5).

TABLE 5

Updated Per-RP PUCCH resource table (max 12-bits each)

| | RP/SF | | | | | | | | | |
|---|---|---|---|---|---|---|---|---|---|---|
| | 0 | 1 | 2 | 3 | 4 | 5 | 6 | 7 | 8 | 9 |
| $RP_1$ | 1 | C | E | E | FFE | 0 | 0 | 0 | 0 | 0 |
| $RP_2$ | 0 | 0 | FFD | E | 0 | 7F3 | 0 | 7 | 7F | EF |
| $RP_3$ | 0 | 0 | 0 | 0 | FFE | 0 | 4 | 0 | C | 4 |
| $RP_4$ | DE | AD | DD | 2 | 123 | FFF | 0 | 0 | BA | 2 |
| ... | ... | ... | ... | ... | ... | ... | ... | ... | ... | ... |
| $RP_{32}$ | FFC | 0 | 234 | 0 | FFF | 523 | 0 | 0 | 129 | 7 |

| | RP/SF | | | | | | | | | |
|---|---|---|---|---|---|---|---|---|---|---|
| | 10 | 11 | 12 | 13 | 14 | 15 | 16 | 17 | 18 | 19 |
| $RP_1$ | 0 | 0 | 0 | 0 | 23 | 0 | 0 | 0 | 27 | FF |
| $RP_2$ | 8 | E0 | 4 | 7 | 8 | 6 | 4 | 83 | 9 | 0 |
| $RP_3$ | C0 | 2 | D0 | 4 | 10 | 4 | 45 | 25 | 4D | FF0 |
| $RP_4$ | FB | 18 | 6 | FC | 110 | 9 | 34 | 36 | 19 | 23 |
| ... | ... | ... | ... | ... | ... | ... | ... | ... | ... | ... |
| $RP_{32}$ | 7 | 75 | 9 | FFF | D | E | 7 | 9 | 5 | 31 |

However, if there's no valid entry in the sortList (e.g., no resource could be allocated), the channel resource allocation procedure may return a failure for the allocation request, e.g., as mentioned above. This condition is referred to as "overload" and is discussed below.

It should also be noted that a first available subframe 224 (with available channel resources) may alternatively be used instead of a least-loaded subframe. For example, in this alternative configuration, the eNodeB would determine a first available subframe with available channel resources across all the RPs 106 communicating with the UE 110 in step 306. Similarly, the eNodeB would assign an available channel resource in the first available subframe to the UE 110. Therefore, the sortList and/or tmpMask may not be utilized in the alternative configuration.

Channel Resource Deallocation Mechanism

When the UE 110 is leaving the system 101 (e.g., disconnecting from the C-RAN 100), or is otherwise released, the eNodeB may free up channel resources (e.g., PUCCH resources) previously allocated to the UE 110. This may include setting a bit for a newly-available channel resource (e.g., PUCCH resource) in each of the TTI masks (for the RPs 106 in the UE's CZV) to "1". For example, the eNodeB may use Equations (4) and (5):

RsrcTable[oldSF].RP[UE.rp[$i$]].mask|=(1<<oldRsrc); (4)

RsrcTable[oldSF].RP[UE.rp[$i$+1]].mask|=(1<<oldRsrc); (5)

where oldSF (e.g., oldSF=4) is the subframe 224 with channel resources (e.g., PUCCH resources) previously allocated to the UE 110; oldRsrc is the bit in the TTI mask(s) (e.g., from Table 1 or 5) for the RP/SF(s) for a channel resource (e.g., PUCCH resource) previously allocated to the UE 110; and the "|=" operator is a bitwise OR. In other words, the deallocation process may include bit ORing a one (shifted as much—to represent the newly-available channel resource) in the TTI mask(s) for channel resources that were previously allocated to the UE 110 leaving the system 101.

It should be noted that the channel resource deallocation may be extended beyond RP[i] and RP[i+1], e.g., for RP[i+2], RP[i+3], etc.

Tracking UE Movements

As UEs 110 move within the site 102, the RPs 106 communicating with the UEs 110 may change. In other words, the UEs' 110 CZVs may change. This is detected using UE 110 RACHs and/or SRS transmissions. Decoding of UE 110 SRS and RACH transmissions may be performed on all RPs 110 and the decoding results ranked according to the SINR (or other signal strength or signal quality metric) received at each of the RPs 106. The CZV bit-vector for a UE 110 may be updated based on whether/when the UE's 110 SINR or other signal metric (received at particular RP(s) 106) has exceeded a predetermined threshold, e.g., by setting bits in the CZV corresponding to the particular RP(s). As before, bits corresponding to other RPs 106 (at which the UE's 110 SINR or other signal metric does not exceed the specific threshold) remain off, meaning those RPs 106 don't see the UE's 110 signal.

Therefore, as a UE 110 moves within the site 102 and its CZV changes, the UE's 110 channel resource (e.g., PUCCH resource) allocations need to be: (1) reserved on those specific RPs 106, which are seeing the UE 110 with good signal strength, using re-allocation mechanism below; and/or (2) de-reserved/de-allocated on those RPs 106, which no longer see the UE's 110 signals, using the de-allocation mechanism above. Once a reservation is done, the UE 110 may be signaled again (e.g., via radio resource management (RRM) signaling) to indicate the new PUCCH signaling resources allocation.

Channel Resource Re-Allocation Mechanism

Figure 4:
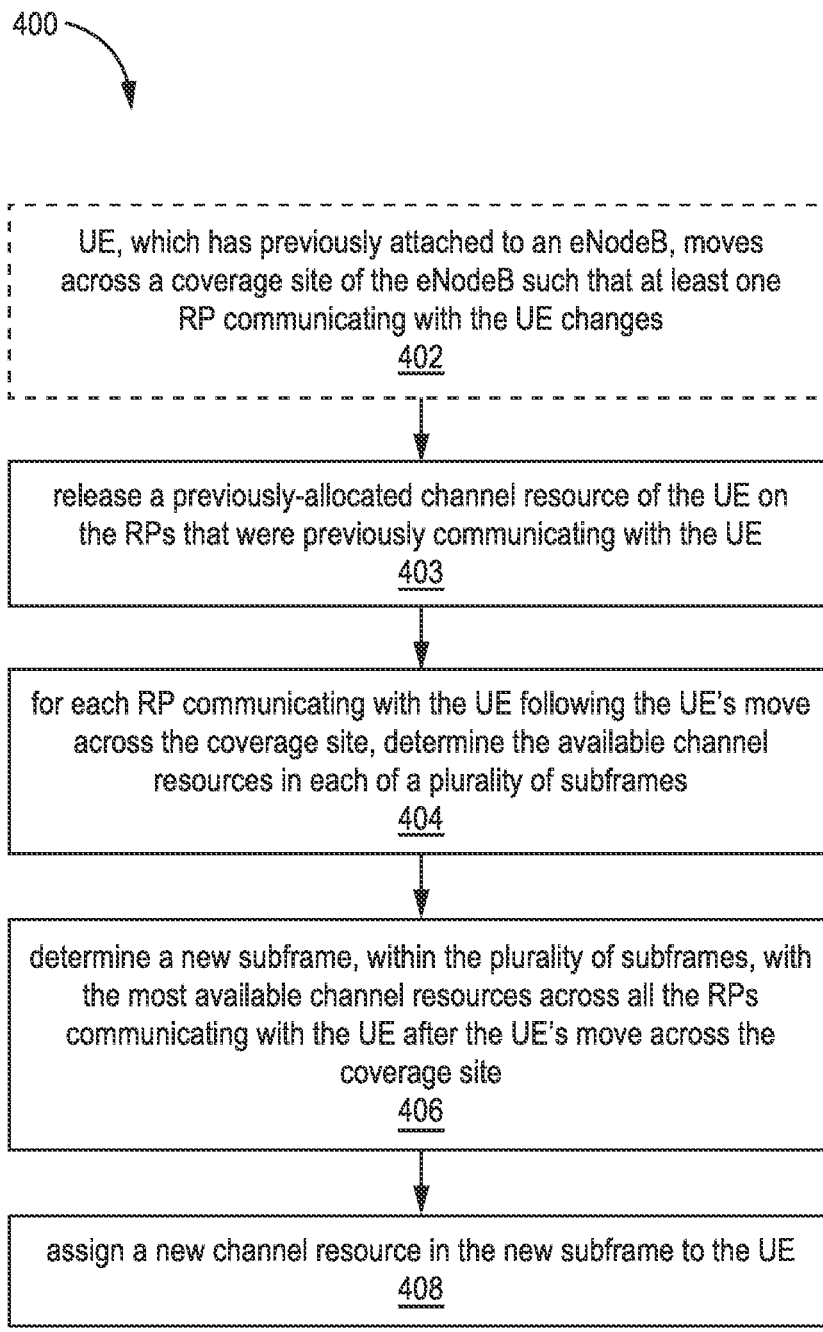
FIG. 4 is a flow diagram illustrating an exemplary method for re-allocating at least one channel resource in a C-RAN to a UE.

FIG. 4 is a flow diagram illustrating an exemplary method 400 for re-allocating at least one channel resource (e.g., PUCCH resources) in a C-RAN 100 to a UE 110. The method 400 may be performed, at least partially, by at least a C-RAN 100 implementing an eNodeB, e.g., a baseband controller 104 in a C-RAN 100.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

The method 400 begins at optional step 402 where a UE 110 (that has previously attached to the eNodeB) moves across a coverage site 102 of the eNodeB such that the at least one RP 106 communicating with the UE 110 change. In other words, the UE's 110 CZV changes in response to moving within the site 102. The CZV bit-vector for the UE 110 may be updated based on when the UE's 110 SINR or other signal metric (received at particular RP(s) 106) has exceeded a predetermined threshold.

With reference to Table 5, assume that the UE 110 was originally located in between $RP_1$ and $RP_3$ (with a CZV of $RP_1$ and $RP_3$) at the time of attachment and was allocated a channel resource at SF=4, rsrc=1, e.g., the first bit in the TTI masks, in a per-RP PUCCH resource table at $RP_1/SF_4$ and $RP_3/SF_4$, are set to "0" because the corresponding PUCCH resource was allocated to the UE 110. However, as the UE 110 moves, it moves closer to $RP_2$ such that the UE's 110 CZV is now $RP_1$, $RP_2$, and $RP_3$.

The method 400 may proceed to step 403 where the eNodeB may release the previously-allocated channel resource of the UE 110 on the RPs 106 that were previously communicating with the UE 110 (e.g., the RPs 106 in the UE's 110 old CZV). For example, the eNodeB may set bit(s) (e.g., in Table 5) corresponding to channel resources previously allocated (and now freed up) to "1" to indicate that they are unreserved. For example, the eNodeB may set bits for channel resources in $RP_1/SF_4$ and $RP_3/SF_4$ to "1" since they were previously allocated to the UE 110, but are now being freed (due to $RP_2/SF_4$ not having any available channel resources). Equations (6)-(7) are examples of how the old channel resources for the UE 110 may be released:

$$RsrcTable[SF=4].RP[UE.rp[i]].mask |= (1<<oldRsrc); \quad (6)$$

$$RsrcTable[SF=4].RP[UE.rp[i+1]].mask |= (1<<oldRsrc); \quad (7)$$

It should be noted that this example only shows old channel resources being released for RP[i] and RP[i+1], but channel resources will be released for as many RPs 106 as are in the UE's old CZV, e.g., a CZV with four RPs 106 means that there would be additional channel resources released for RP[i+2] and RP[i+3].

The method 400 may proceed to step 404 where, for each RP 106 communicating with the UE 110 (after the UE's move across the coverage site 102), the eNodeB may determine the available channel resources (e.g., PUCCH resources) in each of a plurality of subframes 224 (e.g., 20 subframes in Table 5). Step 404 may be performed similarly to step 304 in the method 300 of FIG. 3, e.g., using a tmpMask data structure.

The method 400 may proceed to step 406 where the eNodeB determines a new subframe 224 (among the plurality of subframes 224) with the most available channel resources (e.g., PUCCH resources) across all RPs 106 communicating with the UE 110 (after the UE's move across the coverage site 102). Step 406 may be performed similarly to step 306 in the method 300 of FIG. 3. For example, this step may include (1) counting the number of bits in each subframe 224 of tmpMask[SF]; (2) optionally sorting the elements based on their per-SF count; and (3) optionally preparing a sortList data structure with elements having the most number of bits set being at the head of the list. In some examples, the new subframe may be the same as the subframe in which the UE was previously allocated channel resource(s).

The method 400 may proceed to step 408 where the eNodeB may assign a channel resource in the new subframe 224 to the UE 110, e.g., for each RP 106 in the UE's CZV after it moves—$RP_1$, $RP_2$, and $RP_3$ this example. Step 408 may be performed similarly to step 308 in the method 300 of FIG. 3. Optionally, this may include setting a bit for a newly-assigned channel resource (e.g., PUCCH resource) in each of the TTI masks (for the RPs 106 in the UE's CZV) to "0". Step 408 may include clearing the bit(s) indicated as blocked for the RPs 106 (in the UE's CZV) for those subframes 224. In other words, the eNodeB may set bits for channel resources that are newly-allocated to the UE 110 in Table 5 to "0" to indicate they are reserved for the UE 110. For example, the eNodeB may set bits for channel resources in $RP_1/SF_{18}$, $RP_2/SF_{18}$, and $RP_3/SF_{18}$ to "0" since they are being allocated to the UE 110, e.g., according to Equations (8)-(10):

RsrcTable[SF=19].RP[UE.rp[*i*]].mask &=~(1<<tm-
pAvail);                                                         (8)

RsrcTable[SF=19].RP[UE.rp[*i*+1]].
mask &=~(1<<tmpAvail);                                (9)

RsrcTable[SF=19].RP[UE.rp[*i*+2]].mask &=~
(1<<tmpAvail);                                                 (10)

It should be noted that this example only shows old channel resources being released for RP[i] and RP[i+1], but channel resources will be released for as many RPs 106 as are in the UE's old CZV, e.g., a CZV with four RPs 106 means that there would be additional channel resources released for RP[i+2] and RP[i+3].

In step 408, the eNodeB may return (SF, tmpAvail) for this UE 110. For example, Table 6 is an example PUCCH resource table after re-allocating the UE 110 to subframe 18 on $RP_1$, $RP_2$, and $RP_3$. In other words, Table 6 may be an example of Table 5 after re-allocating the UE 110 to $SF_{18}$ on $RP_1$, $RP_2$, and $RP_3$ (where the entries in $RP_1/SF_{18}$, $RP_2/SF_{18}$, and $RP_3/SF_{18}$ are changed from "27", "9", and "4D" in Table 5 to "26", "8", and "4C" in Table 6, respectively). Table 6 may also be an example of Table 5 after releasing channel resources in $SF_4$ on $RP_1$ and $RP_3$ (where the entries in $RP_1/SF_4$ and $RP_3/SF_4$ are changed from "FFE" in Table 5 to "FFF" in Table 6).

TABLE 6

Updated Per-RP PUCCH resource table (max 12-bits each)

| | RP/SF | | | | | | | | | |
|---|---|---|---|---|---|---|---|---|---|---|
| | 0 | 1 | 2 | 3 | 4 | 5 | 6 | 7 | 8 | 9 |
| $RP_1$ | 1 | C | E | E | FFF | 0 | 0 | 0 | 0 | 0 |
| $RP_2$ | 0 | 0 | FFD | E | 0 | 7F3 | 0 | 7 | 7F | EF |
| $RP_3$ | 0 | 0 | 0 | 0 | FFF | 0 | 4 | 0 | C | 4 |
| $RP_4$ | DE | AD | DD | 2 | 123 | FFF | 0 | 0 | BA | 2 |
| ... | ... | ... | ... | ... | ... | ... | ... | ... | ... | ... |
| $RP_{32}$ | FFC | 0 | 234 | 0 | FFF | 523 | 0 | 0 | 129 | 7 |

| | RP/SF | | | | | | | | | |
|---|---|---|---|---|---|---|---|---|---|---|
| | 10 | 11 | 12 | 13 | 14 | 15 | 16 | 17 | 18 | 19 |
| $RP_1$ | 0 | 0 | 0 | 0 | 23 | 0 | 0 | 0 | 26 | FF |
| $RP_2$ | 8 | E0 | 4 | 7 | 8 | 6 | 4 | 83 | 8 | 0 |
| $RP_3$ | C0 | 2 | D0 | 4 | 10 | 4 | 45 | 25 | 4C | FF0 |
| $RP_4$ | FB | 18 | 6 | FC | 110 | 9 | 34 | 36 | 19 | 23 |
| ... | ... | ... | ... | ... | ... | ... | ... | ... | ... | ... |
| $RP_{32}$ | 7 | 75 | 9 | FFF | D | E | 7 | 9 | 5 | 31 |

However, if there's no valid entry in the sortList (e.g., no resource could be allocated), the channel resource allocation procedure may returns a failure for the allocation request. This is referred to as overload and is discussed below.

Non-DRX-Aware Capacity Calculation

Once a channel resource is allocated/reserved, the UE 110 is signaled via radio resource management (RRM) signaling to indicate the new channel resource (e.g., PUCCH resource) allocation. This way, the scheme can cater to a max of 20(TTI)*12(resources)=240 UEs 110 under each RP 106 (or group of RPs 106). Therefore, in a 32-RP system 101, this scheme can support 32*240=7680 resources/UEs in the system 101.

On average, when the UEs 110 are present on diverse RPs 106, the present systems and methods may support a suitably high number of resources/UEs, even for UEs 110 with 8-RP CZVs. As the UEs 110 move amongst RPs 106, the channel resource (e.g., PUCCH resource) allocations change and UEs 110 are reconfigured. But as the UE 110 movement is expected to be slow, the increase in number of radio resource control (RRC) reconfiguration signaling messages may not be as high.

The present systems and methods may be used to allocate channel resources (e.g., PUCCH resource) to UEs 110 that are not capable of discontinuous reception (DRX) and/or not configured for DRX by the eNodeB. As more DRX-disabled UEs 110 congregate under specific RPs 106, the CU-level scaling requirements are applied at RPs 106, and RP-associated resource allocation (non-DRX-aware channel resource allocation) may run out of resources. In the examples used herein, each RP 106 (or group of RPs 106) can handle up to 20(TTI)*12(resources)=240 UEs 110. However, if more and more DRX-disabled UEs 110 arrive at the RP 106, then additional overload protection methods may kick in, like using reduced inactivity-timers for the UEs 110, pro-active offloading/handing over of UEs 110 to nearby sector, PRACH-level back-off etc.

However, when DRX-capable/enabled UEs 110 enter the system 101 (e.g., attach to the C-RAN 100), a DRX-aware channel resource (e.g., PUCCH resource) allocation mechanism, discussed below, may be used to accommodate more such UEs 110.

Discontinuous Reception (DRX) Overview

Basic parameters and terminology are now described. The term "DRX cycle" (also referred to as drxLongCycle or "DRX long cycle") refers to the duration of one on-duration followed by one off-duration. The length of a DRX cycle 502 may be calculated based on subframe time/length and a longdrx-CycleStartOffset parameter. The parameter onDurationTimer is the duration of an on-duration within a DRX cycle 502, e.g., onDurationTimer may be a sub-portion of a drxOn period 501.

The parameter drxInactivityTimer specifies how long a UE 110 should remain ON after the reception of a Physical Downlink Control Channel (PDCCH). When this timer is on, the UE 110 remains in an ON state, which may extend the UE 110 ON-duration into the OFF period, e.g., drxInactivityTimer may be a variable sub-portion of a drxOn period 501.

The parameter drxRetransmissionTimer specifies the maximum number of consecutive PDCCH subframes the UE 110 should remain active to wait for an incoming retransmission after the first available retransmission time, e.g., for HARQ retransmissions, e.g., drxRetransmissionTimer may be a sub-portion of a drxOn period 501. Optionally, drxRetransmissionTimer may be set to 0 for a UE 110 if there are no incoming retransmissions.

Figure 5A:
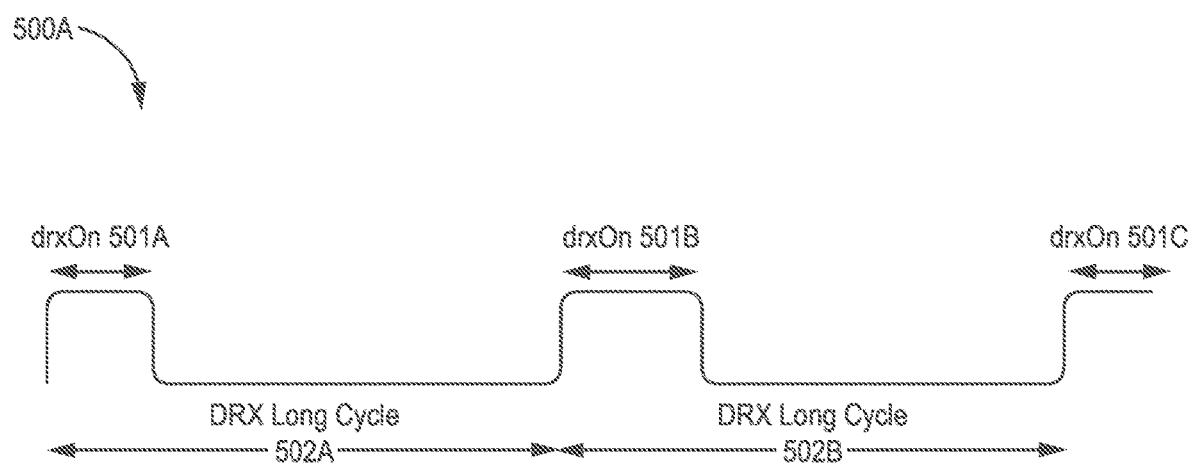
FIG. 5A is a sequence diagram illustrating basics of discontinuous reception (DRX) available for UEs and eNodeBs in 3GPP.

FIG. 5A is a sequence diagram 500A illustrating basics of discontinuous reception (DRX) available for UEs 110 and eNodeBs in 3GPP. DRX is a capability present in some UEs 110 that provides battery savings for the UE 110 and allows for the UE 110 to do inter-frequency neighbor cell signal strength measurements. As can be seen in FIG. 5A, a DRX-enabled UE's 110 receiver will generally listen to its serving cell C-RAN 100 (UE 110 active) during a drxOn 501A-C portion of a DRX cycle 502A-B and not listen to its serving cell C-RAN 100 (UE 110 sleeping) during the remaining portion of the DRX cycle 502. A drxOn 501 period may include an onDurationTimer, a drxInactivityTimer and a drxRetransmissionTimer portion.

Figure 5B:
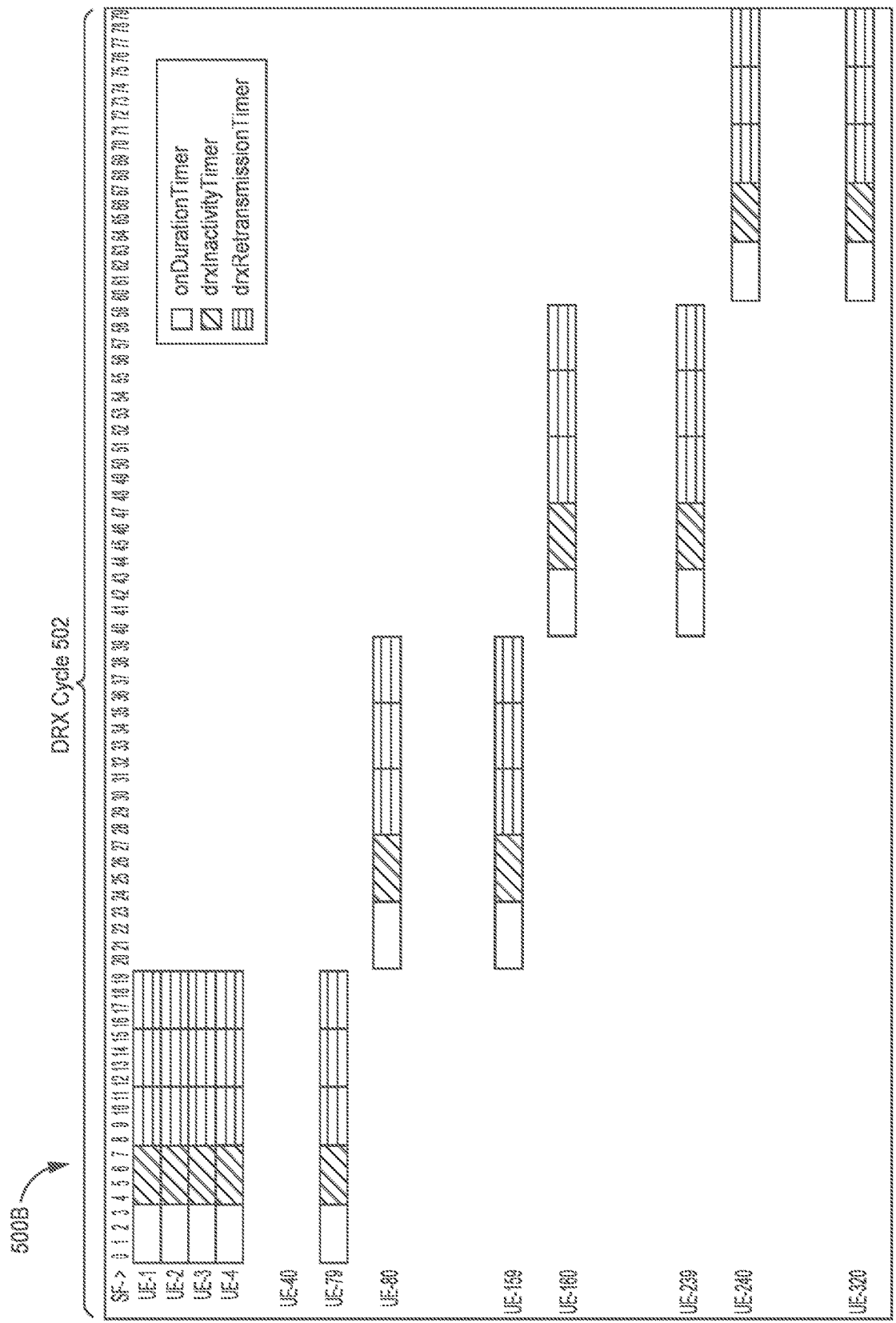
FIG. 5B is a timing diagram illustrating DRX cycles.
Figure 5C:
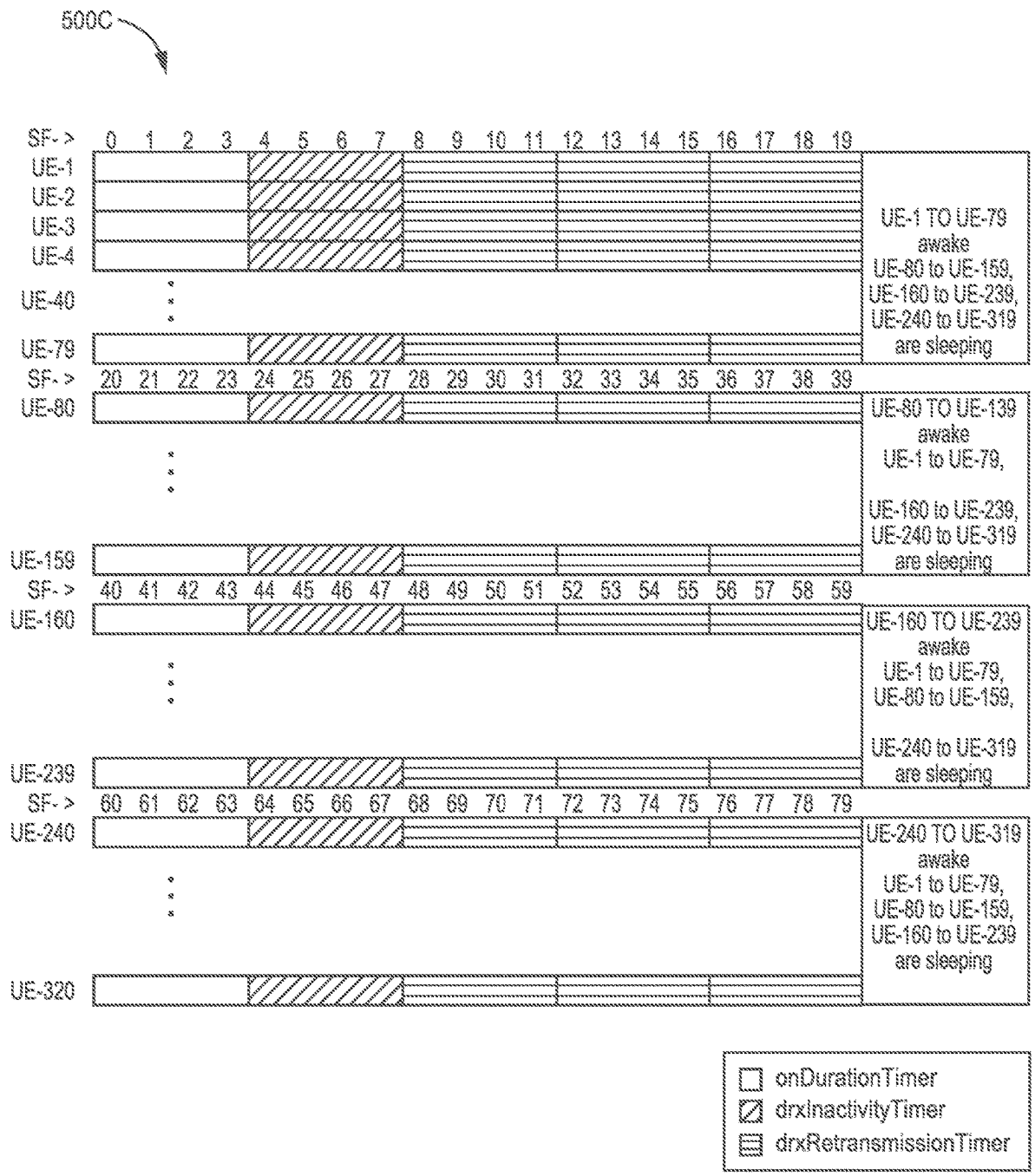
FIG. 5C is another timing diagram illustrating DRX cycles.

FIG. 5B is a timing diagram 500B illustrating DRX cycles 502. FIG. 5C is another timing diagram 500C illustrating DRX cycles 502. The timing diagram 500C in FIG. 5C is an alternative view of the same example configuration in the timing diagram 500B in FIG. 5B.

FIGS. 5B-5C illustrate a group of 320 UEs 110, each having a drxOn period 501 and a sleep period. A drxOn period includes an onDurationTimer portion (where the UE 110 looks for its own data, e.g., PDCCH transmissions to the UE 110), a variable inactive portion (also referred to as drxInactivityTimer), and an optional retransmission portion (also referred to as drxRetransmissionTimer). Therefore, if there are no further data-after-inactivity/retransmissions, the UE 110 should sleep after completion of the onDurationTimer and drxInactivityTimer portions.

In a C-RAN 100 deployment, the DRX offsets of different UEs 110 may be configured so that the UEs' 110 on-durations (drxOn period 501) are spread throughout the entire drxLongCycle 502. By adjusting the offset for each UE 110, different UEs 110 are set to have an on-duration at different periods through the DRX cycle 502.

In the example of FIGS. 5B-5C, assume the DRX-cycle 502 is configured to be 80 ms and onDurationTimer to be 4 ms and drxInactivityTimer to be 4 ms. When there's no traffic, a certain portion of UEs 110 remain asleep after the onDurationTimer+drxInactivityTimer(variable) (4+x*4, e.g., between 8-20 ms) until the end of the DRX-cycle 502—80 ms in this example.

In the example of FIGS. 5B-5C, the drxLongCycle 502 is subdivided into 4 subCycles, with about 80 UEs 110 shown to be awake in each of those subCycles. In other words, UE-1 to UE-79 are active in a first subCycle (subframes 0-19), UE-80 to UE-159 are active in a second subCycle (subframes 20-39), UE-160 to UE-239 are active in a third subCycle (subframes 40-59), and UE-240 to UE-320 are active in a fourth subCycle (subframes 60-79). Furthermore, each subCycle may be associated with a drxOffset measured in subframes, e.g., subCycle 1=drxOffset starting at SF0; subCycle 2=drxOffset starting at $SF_{21}$; subCycle 3=drxOffset starting at $SF_{41}$; subCycle 4=drxOffset starting at $SF_{61}$. It should be noted that if there are any re-transmissions to or any uplink transmissions from a UE 110, the UE's 110 DRX-on period may extend and reduces the UE's 110 sleep cycle.

In the example of FIGS. 5B-5C, the expectation is that the UEs 110 typically finish up their transmissions in their drxOn/Inactivity/Retransmission timer periods and go back to sleep. Their sleep-times are used for picking up another set of UE's transmissions and scheduling them.

DRX-Aware Channel Resource Allocation Mechanism

An eNodeB (e.g., implemented using a C-RAN 100) may implement a DRX-aware channel resource allocation mechanism that utilizes DRX-silent periods in order to accommodate more UEs 110.

Since sleeping UEs 110 are configured to not transmit any PUCCH transmissions, the DRX-aware channel resource allocation mechanism may utilize the sleep/silent period of a set of UEs 110 to schedule other UE 110 transmissions, thereby accommodating more UEs 110 in the system 101. As before, PUCCH resource management is described, but the proposal is generally applicable to eNodeB scheduling of any downlink data channels and/or uplink data channels, as well as overload management.

For the DRX-aware approach, the per-RP PUCCH resource table (e.g., Tables 1, 5, and 6 above) is renamed as drxAwareRsrcTable[ ], and the drxLongCycle (example of 80 ms) is subdivided into X (e.g., four) subCycles and the above per-RP-PUCCH-resource-table is repeated/instantiated for each of those subCycle times, as described below.

FIG. 6A is a table illustrating an example of a DRX-aware, per-RP PUCCH resource table (drxAwareRsrcTable[ ]). When a UE 110 enters into the system or a UE 110 moves into at least one RP's 106 vicinity, the DRX-aware channel resource (e.g., PUCCH resource) allocation may be performed similar to the non-DRX aware channel resource mechanism discussed above. Specifically, the DRX-aware channel resource mechanism may result in either allocation or re-allocation of new channel resources (e.g., PUCCH resources). The allocations/re-allocations may be done (on the table) for all X subCycles, for the UE's 110 rsrc-SF and for all CZV RPs 106, e.g., according to Equation (11):

for subCycle=1 . . . X:drxAwareRsrcTable[subCycle]
[SF].RP[UE.rp[i]].mask &=~(1<<rsrcAvail);  (11)

where rsrcAvail indicates the location of the available bit/resource that that could be allocated to the UE 110, e.g., if rsrcAvail=5, then the 5th bit in the TTI mask is available for allocation to the UE 110. Furthermore, drxAwareRsrcTable[subCycle][SF].RP[UE.rp[i]].mask is the TTI mask in the table of FIG. 6A for subCycle "subCycle," subframe SF and the ith RP 106 in the UE's CZV.

Similarly, if the UE's 110 old resources are de-allocated, they are freed, e.g., according to Equation (12):

for subCycle=1 . . . X:drxAwareRsrcTable[subCycle]
[oldSF].RP[UE.rp[i]].mask|=(1<<oldRsrc);  (12)

For the DRX-disabled UEs 110, the channel resource(s) (rsrc(s)) allocated/reserved on all X subCycles generally remain the same, until the UEs 110 move to different RPs 106 (which results in a change in CZV), or they get released.

For DRX-capable/enabled UEs 110, the same scheme of channel resource allocation on all X subCycles may be followed as long as there's no collision in the system. Therefore, in this example, 12 rsrcs*20 SFs=240 resources/UEs can be served by the same RP 106 or group of RPs 106 (MAX_for_RP=240) before collisions begin.

However, once there are more than MAX_for_RP (e.g., 240) UEs 110 and a channel resource has to be allocated for a new DRX capable/enable UE 110, the eNodeB may try to allocate a shared resource. Specifically, the eNodeB may pair the new DRX capable/enable UE 110 with a different DRX-capable/enabled UE 110 (both having matching (or at least overlapping) CZVs), but each being in a different DRX subCycle/drxOn period/drxOffset value. In other words, when an RP 106 (or group of RPs 106) exceeds its MAX_for_RP, the eNodeB may allocate a channel resource for a new DRX capable/enable UE 110 with a different DRX-capable/enabled UE 110 that has an overlapping (or identical) CZV, but different DRX subCycle. This way, more UEs 110 may be accommodated under each RP 106 (or group of RPs 106) in the C-RAN 100, e.g., X subCycles*MAX_for_RP resources/UEs.

As shown in FIG. 6A, the drxAwareRsrcTable is initially identical on all subCycles (X=4, each being 20 ms long) of the drxLongCycle period (80 ms) when there's no collision. In other words, $RP_X/SF_Y=RP_X/SF_{(Y+20)}=RP_X/SF_{(Y+40)}=RP_X/SF_{(Y+60)}$ in FIG. 6A. For simplicity sake, in the example below and in FIG. 6A, if four subCycles are used, the UEs 110 may be allocated to subCycles as show in Table 7:

TABLE 7

| | subCycle Boundaries | |
|---|---|---|
| | drxOffset starting at | subCycle allotted |
| 1st group of UEs | SF = 0 | 1 |
| 2nd group of UEs | SF = 20 | 2 |
| 3rd group of UEs | SF = 40 | 3 |
| 4th group of UEs | SF = 60 | 4 |

Additionally, various techniques may optionally be used to uniformly distribute the UEs 110 across different subCycles.

A high-demand situation may occur when a DRX-enabled UE 110 enters the system (e.g., attaches to the eNodeB/C-RAN 100) and/or moves between RPs 106, and if its resource configuration couldn't be satisfied by the free-resources in any of the TTIs/subframes that (1) correspond to the UE's 110 CZV-RP rows; and (2) are in the subCycle corresponding to the UE's 110 drxOffset.

Figure 7A:
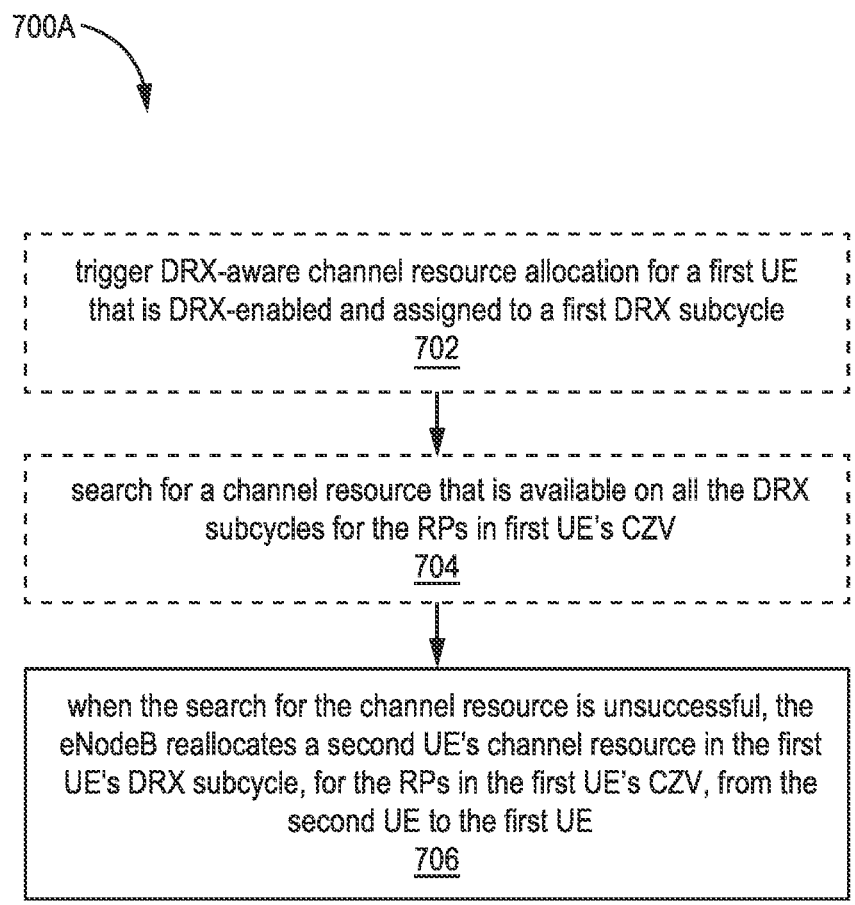
FIG. 7A is a flow diagram illustrating a method for DRX-aware channel resource allocation.

FIG. 7A is a flow diagram illustrating a method 700A for DRX-aware channel resource allocation. The method 700A may be performed by at least an eNodeB, e.g., implemented by a C-RAN 100. In some examples, the method 700B may be performed, at least partially, by a baseband controller 104 in a C-RAN 100. The eNodeB may provide wireless service to a plurality of UEs 110, each of which is assigned to one of a plurality of DRX subCycles. Optionally, the eNodeB may also provide wireless service to at least one UE 110 that is not DRX-enabled and/or not DRX-capable. It should be noted that channel resources used in the method 700A may include resources for PUCCH transmissions, SRS transmissions, parameters influencing data channel transmissions, etc.

The blocks of the flow diagram shown in FIG. 7A have been arranged in a generally sequential manner for ease of explanation; however, it is to be understood that this arrangement is merely exemplary, and it should be recognized that the processing associated with method 700A (and the blocks shown in FIG. 7A) can occur in a different order (for example, where at least some of the processing associated with the blocks is performed in parallel and/or in an event-driven manner). Also, most standard exception handling is not described for ease of explanation; however, it is to be understood that method 700A can and typically would include such exception handling.

The method 700A may begin at optional step 702 where an eNodeB may trigger DRX-aware channel resource allocation for a first UE 110 that is DRX-enabled and assigned to a first DRX subCycle. A DRX-aware channel resource allocation may be triggered in response to (1) an RP (or group of RPs) in the C-RAN 100 reaching or exceeding a maximum/threshold number of UEs 110 it can serve (MAX_for_RP); and/or (2) a UE 110 attaching to the eNodeB or moving within a coverage site 102 of an eNodeB to which it has previously attached. Additionally or alternatively, the DRX-aware channel resource allocation may be triggered in response to other events.

The method 700A may proceed to optional step 704 where the eNodeB may search for a channel resource that is available on all the DRX subCycles for the RPs in first UE's 110 CZV. For example, the eNodeB may attempt to perform non-DRX-aware channel resource allocation for the first UE 110 described above, e.g., using a per-RP PUCCH resource table, a sortList data structure (e.g., using LeastLoadedSubframeSortList (or) subFrameRankList), and/or a tmpMask data structure. If the search in optional step 704 is successful, the eNodeB may assign the channel resource to the first UE 110 on all the DRX subCycles for the RPs 106 in the first UE's 110 CZV.

However, such a non-DRX-aware channel resource allocation may not be successful, e.g., if an available channel resource cannot be identified on every subCycle and/or on every RP 106 in the first UE's 110 CZV. Accordingly, the method 700A may proceed to step 706 where, when the search for the channel resource is unsuccessful, the eNodeB reallocates a second UE's channel resource in the first UE's DRX subCycle, for the RPs 110 in the first UE's CZV, from a second UE 110 to the first UE 110. In one example, the reallocation may be performed only if the first UE's CZV matches the second UE's CZV. The second UE 110 may be DRX-enabled and assigned to a second DRX subCycle that is different than the first DRX subCycle. Reallocating the second UE's channel resource may include (1) determining/verifying that the second UE's channel resource is reserved, on all RPs 106 in the first UE's CZV, in all DRX subCycles; (2) releasing the second UE's channel resource (in all DRX subCycles except the second UE's DRX subCycle); and/or (3) allocating the second UE's channel resource (in the first UE's DRX subCycle) to the first UE 110.

In other words, when search for a channel resource available on all DRX subcycles (in optional step 704) is unsuccessful, the eNodeB may reallocate the second UE's channel resource (in the first UE's DRX subCycle), such that when second UE 110 is awake in the second DRX subCycle (to which it is assigned), the first UE 110 is asleep. Conversely, when first UE 110 is awake in the first DRX subCycle (to which it is assigned), the second UE 110 is asleep. Accordingly, the second UE 110 will not be disadvantaged from the reallocation of the this channel resource in the first UE's DRX subCycle (because the second UE 110 is asleep in the first UE's DRX subCycle).

Therefore, the first and second UEs 110 can both share same channel resource, except that they are in different DRX subCycles. If four DRX subCycles are considered, then only two of the four DRX subCycles would be allocated for the first and second UEs 110, and same channel resource in the remaining two DRX subCycle resources is available for other UEs 110 that may attach in the future, e.g., with the same (or similar) CZV as the first and second UEs 110.

It should be noted that step 706 may be performed without first requiring a failed search, e.g., without first requiring a failed search for a channel resource that is available in all DRX subCycles. For example, step 706 may be performed following optional step 702 (without intervening step 704), e.g., step 706 may be performed in response to DRX-aware channel resource allocation being triggered for the first UE 110 without waiting for an attempt at non-DRX-aware channel resource allocation.

Figure 7B:
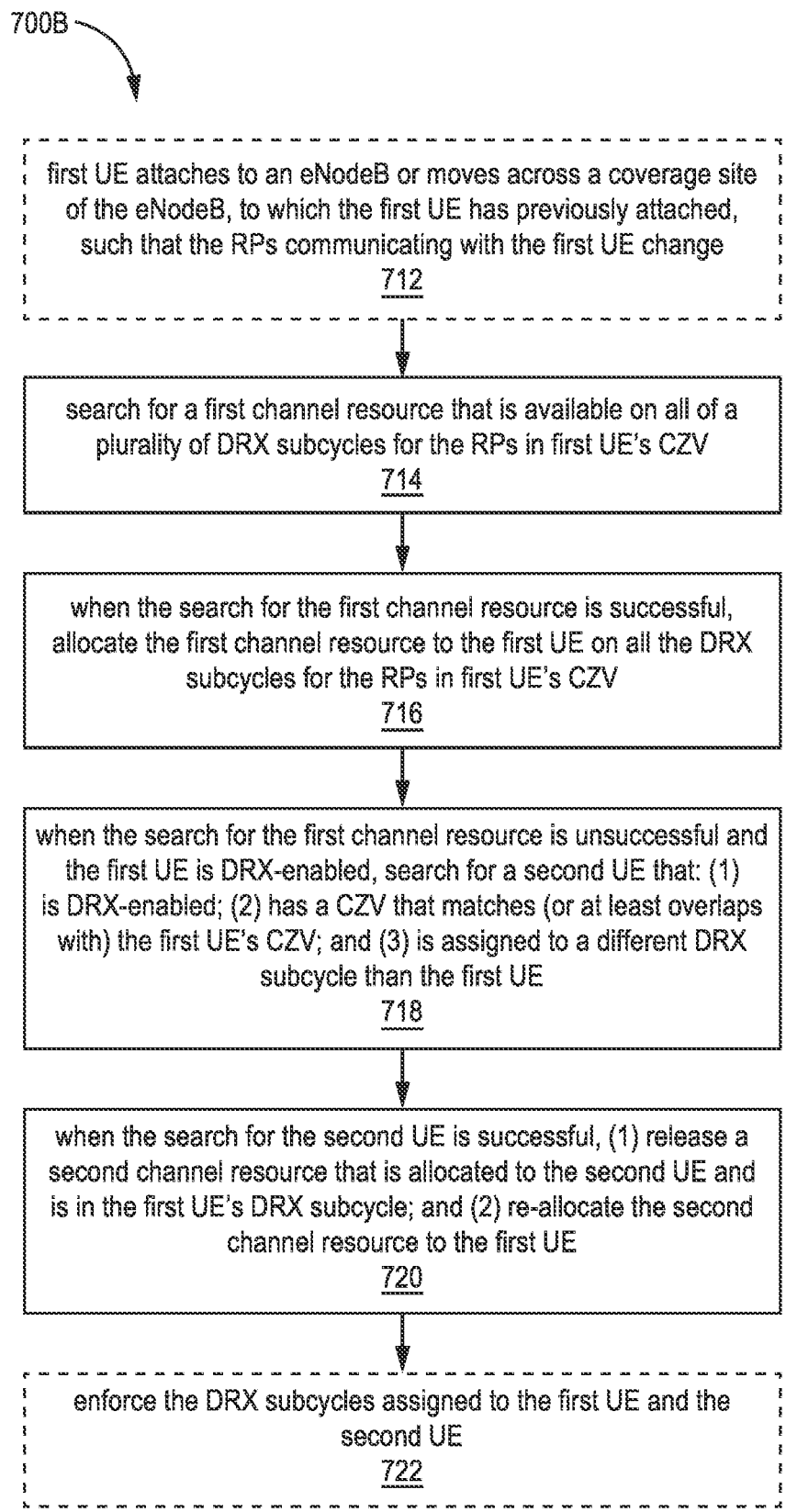
FIG. 7B is a flow diagram illustrating another method for DRX-aware channel resource allocation.

FIG. 7B is a flow diagram illustrating another method 700B for DRX-aware channel resource allocation. The method 700B may be performed by at least an eNodeB implemented by a C-RAN 100 (e.g., by a baseband controller 104 in a C-RAN 100) and optionally a first UE 110. The eNodeB may provide wireless service to a plurality of UEs 110, each of which is assigned to one of a plurality of DRX subCycles. Optionally, the eNodeB may also provide wireless service to at least one UE 110 that is not DRX-enabled and/or not DRX-capable. For example, the eNodeB may maintain a DRX-aware, per-RP PUCCH resource table (drxAwareRsrcTable[ ]) according to FIG. 6A.

The blocks of the flow diagram shown in FIG. 7B have been arranged in a generally sequential manner for ease of explanation; however, it is to be understood that this arrangement is merely exemplary, and it should be recognized that the processing associated with method 700B (and the blocks shown in FIG. 7B) can occur in a different order (for example, where at least some of the processing associated with the blocks is performed in parallel and/or in an event-driven manner). Also, most standard exception handling is not described for ease of explanation; however, it is to be understood that method 700B can and typically would include such exception handling.

In the method 700B, assume that four DRX subCycles are used, each DRX subCycle being 20 subframes long. Also assume that (1) the first UE 110 (also referred to as $UE_{ueid}$) is assigned to the first DRX subCycle ($UE_{ueid}$.drxOffset=0; $UE_{ueid}$.subCycle=1); and (2) the second UE 110 (also referred to as $UE_{incumbent}$) is assigned to the second DRX subCycle ($UE_{ueid}$.drxOffset=20; $UE_{ueid}$.subCycle=2).

The method 700B may begin at optional step 712 where a first UE 110 (1) attaches to the eNodeB and/or (2) moves across a coverage site 102 of the eNodeB, to which the first UE 110 has previously attached, such that the RPs 106 communicating with the first UE 110 change. In other words, the first UE 110 attaches to the eNodeB or moves in such a way that its CZV changes. For example, assume that first UE's 110 CZV is $RP_1$, $RP_2$, and $RP_3$.

The method 700B may proceed to step 714 where the eNodeB may search for a first channel resource that is available on all DRX subCycles for the RPs 106 in the UE's 110 CZV. For example, this may include (1) identifying a first channel resource in the first UE's 110 DRX subCycle; and (2) trying to reserve the first channel resource in all 4 DRX subCycles. In other words, the eNodeB may search for free resources in the first UE's 110 DRX subCycle (to identify a SF and available bit/resource (rsrcAvail) in the identified SF), then try to reserve it for all four DRX subCycles, e.g., in drxAwareRsrcTable[subCycles=1 ... 4][SF].RP[$UE_{ueid}$.rp[ ... ]].mask.

The method 700B may proceed to step 716 where, when the search is successful, the eNodeB may allocate the first channel resource to the first UE 110 on all the DRX subCycles for the RPs 106 in first UE's 110 CZV. Alternatively, if the search is unsuccessful (e.g., allocation/reallocation fails) in at least one subCycle (and/or for at least one RP 106 in the first UE's 110 CZV) and if the first UE 110 is DRX-disabled, the channel resource allocation procedure may return a failure message for the allocation request. In other words, if the first UE 110 is not DRX-enabled, the eNodeB may not attempt to re-allocate a channel resource from a different UE 110 in a different subCycle to the first UE 110, as described below.

The method 700B may proceed to step 718 where, when the search for the first channel resource is unsuccessful and the first UE 110 is DRX-enabled, the eNodeB may search for a second UE 110 that: (1) is DRX-enabled; (2) has a CZV that matches (or at least overlaps with) the first UE's 110 CZV; and (3) is assigned to a different DRX subCycle than the first UE 110.

The method 700B may proceed to step 720 where, when the search for the second UE 110 is successful, the eNodeB may (1) release a second channel resource that is allocated to the second UE 110 and is in the first UE's 110 DRX subCycle; and (2) re-allocate the second channel resource to the first UE 110.

The method 700B may proceed to optional step 722 where the eNodeB enforces the DRX subCycles assigned to the first UE 110 and the second UE 110. For example, the L3 processing in the eNodeB (CU-L3) may inform L2 processing in the eNodeB (CU-L2) to strictly adhere/enforce the DL/UL allocations only to the specific subCycles assigned to the first UE 110 and second UE 110 (for $UE_{ueid}$ (1st subCycle) and $UE_{incumbent}$ (2nd subCycle)). Both the first UE 110 and second UE 110 may be forced to sleep in other subCycles, to avoid interfering with other UE PUCCH transmissions in other cycles. The management of DRX activity of UEs 110 is described below.

FIG. 6B is a table illustrating another example of a DRX-aware, per-RP PUCCH resource table (drxAwareRsrcTable[ ]). Specifically, the table in FIG. 6B illustrates an updated DRX-aware, per-RP PUCCH resource table after DRX-aware channel resource allocation is performed, e.g., according to the one or both of the methods 700A, 700B in FIGS. 7A and 7B, respectively. In other words, FIG. 6A may represent a DRX-aware, per-RP PUCCH resource table before DRX-aware channel resource allocation is performed, and FIG. 6B may represent the DRX-aware, per-RP PUCCH resource table after the DRX-aware channel resource allocation is performed.

An example of DRX-aware channel resource allocation for a first DRX-aware UE 110 follows. Assume the same parameters as in the method 700 of FIG. 7B: (1) the first DRX-aware UE 110 is assigned to the first subCycle and has a CZV of $RP_1$, $RP_2$, and $RP_3$; (2) a second DRX-aware UE 110 is assigned to the second subCycle.

In this example, the rsrc=1 (1st bit) at $RP_1/SF_3$, $RP_2/SF_3$, and $RP_3/SF_3$ is freed up (set to "1" to indicate that the resource is available) in the first subCycle, e.g., in step 720 after the second UE 110 is identified in step 718. The rsrc=1 (1st bit) at $RP_1/SF_3$, $RP_2/SF_3$, and $RP_3/SF_3$ may also be freed up in 3rd and 4th sub-cycles (if occupied by the same second UE 110 ($UE_{incumbent}$)), to accommodate other UEs 110 with similar or identical CZVs. In other words, the second UE's 110 channel resources (in subCycles it is not assigned to—1, 3, and 4) may be freed up (e.g., in step 720) after the eNodeB has determined (e.g., in step 718) that the second UE 110 (1) is DRX-enabled; (2) has a CZV that matches (or at least overlaps with) the first UE's 110 CZV; and (3) is assigned to a different DRX subCycle than the first UE 110.

After the rsrc=1 (1st bit) at $RP_1/SF_3$, $RP_2/SF_3$, and $RP_3/SF_3$ is freed up in the first subCycle (and third and fourth subCycles), the rsrc=1 (1st bit) at $RP_1/SF_3$, $RP_2/SF_3$, and $RP_3/SF_3$ may be blocked again for the first UE 110, e.g., in step 720. Accordingly, even though the entries for $RP_1/SF_3$, $RP_2/SF_3$, and $RP_3/SF_3$ equal "E", "E", and "0", respectively, in the first subCycle of both FIGS. 6A and 6B, the entries include a channel resource allocation for the second UE 110 in FIG. 6A and instead a channel resource allocation for the first UE 110 in FIG. 6B. In contrast, the entries for $RP_1/SF_3$, $RP_2/SF_3$, and $RP_3/SF_3$ equal "E", "E", and "0", respectively, in the second subCycle of both FIGS. 6A and 6B and include a channel resource allocation for the second UE 110 (but not the first UE 110). Furthermore, the entries for $RP_1/SF_3$, $RP_2/SF_3$, and $RP_3/SF_3$ in the third and fourth subCycles of FIG. 6A ("E", "E", and "0", respectively) include a channel resource allocation for the second UE 110 in FIG. 6A, whereas the channel resource (rsrc) allocated to the second UE 110 is freed in FIG. 6B (so $RP_1/SF_3$, $RP_2/SF_3$, and $RP_3/SF_3$ equal "F", "F", and "1", respectively, in FIG. 6B). The first UE 110 may be reconfigured through RRC signaling to inform the first UE 110 about its new allocation in the subCycle at $RP_1/SF_3$, $RP_2/SF_3$, and $RP_3/SF_3$.

As a variation, once a UE 110 is re-assigned to share its resources with another UE 110 in a different DRX subCycle, both the UEs 110 can be added to a special list. Then, whenever UE 110 resources become free on all subCycles, the non-shared resources can be re-assigned to the UEs 110 on the special list in an orderly manner. Also, as the system load under RPs 106 reach specific thresholds, pro-active overload handling methods can be performed, e.g., reducing inactivity-timers, proactive handovers, and/or RACH back-offs.

DRX-Aware Capacity Calculation

Using the DRX-aware channel resource allocation above, each RP 106 may provide wireless service for up to 4(subcycles)*20(TTI)*12(resources)=960 resources/UEs. In a 32-RP system, this becomes 32*960=30720 resources/UE's in the system 101.

Managing the DRX Activity of UEs

As per standards, whenever a UE 110 has any uplink data to send, even if it is in DRX-off period (e.g., the UE 110 is asleep in drxLongCycle), it can initiate a PUCCH scheduling request and wait for an SR-Pending Timer to get an uplink grant from the eNodeB.

However, instead of providing a grant to the trying-to-wake-up UE 110, the eNodeB may send the UE 110 back to sleep by sending a DRX Mac Control Element command, e.g., according to 3GPP standard 36.321 Section 5.7 and Section 6.1.3.3. The DRX-aware channel resource allocation may utilize this method in the eNodeB's L2 processing to force the trying-to-awake-UE 110 back to stay asleep, thus ensuring the above subCycle, RP-associated reservations/allocations are honored. This ensures that the DRX-aware channel resource allocation can be realized and the scaling can be achieved by using the 3GPP-approved methods and it will work with different UE 110 implementations.

Partial DRX-Aware Channel Resource Allocation Mechanism

FIG. 8 is a table illustrating another example of a partial DRX-aware, per-RP PUCCH resource table. Specifically, the table in FIG. 8 illustrates a partial DRX-aware, per-RP PUCCH resource table that can be utilized during a partial DRX-aware channel resource allocation.

In some configurations, as the system load (e.g., number of UEs 110 transmitting to an RP 106 or a group of RPs 106) is initially within a threshold, only non-DRX-aware channel resource allocation may be used for UEs 110 allocated in a first set of subframes (e.g., $SF_0$-$SF_7$). Then, as system load increases beyond the threshold, the remaining UEs 110 may be allocated in a second set of subframes (e.g., $SF_8$-$SF_{19}$). When allocating channel resources in the second set of subframes (e.g., $SF_8$-$SF_{19}$), the channel resource allocation may be performed according to the non-DRX-aware approach and the DRX-aware approach.

For example, an eNodeB may search $SF_0$-$SF_7$ for channel resources to allocate to non-DRX-enabled UE(s) 110, but search $SF_8$-$SF_{19}$ for channel resources to allocate to DRX-enabled UEs 110. In this way, both the non-DRX-aware approach and the DRX-aware approach may be performed in parallel. In other words, the eNodeB may search in a particular range of subframes based on whether a UE 110 needing a channel resource allocation is DRX-enabled or not.

Then, when a UE 110 with channel resources allocated in the first set of subframes (e.g., $SF_0$-$SF_7$) is freed up (the channel resources are freed up), and if the system load still hasn't come down below the threshold, the freed-up channel resources can be re-allocated using the DRX-aware approach. As system load reduces below the threshold, only non-DRX-aware channel resource allocation may be used again. In other words, depending on the system load, an eNodeB may use (1) only non-DRX-aware channel resource allocation; or (2) non-DRX-aware channel resource allocation and DRX-aware channel resource allocation.

Figure 9:
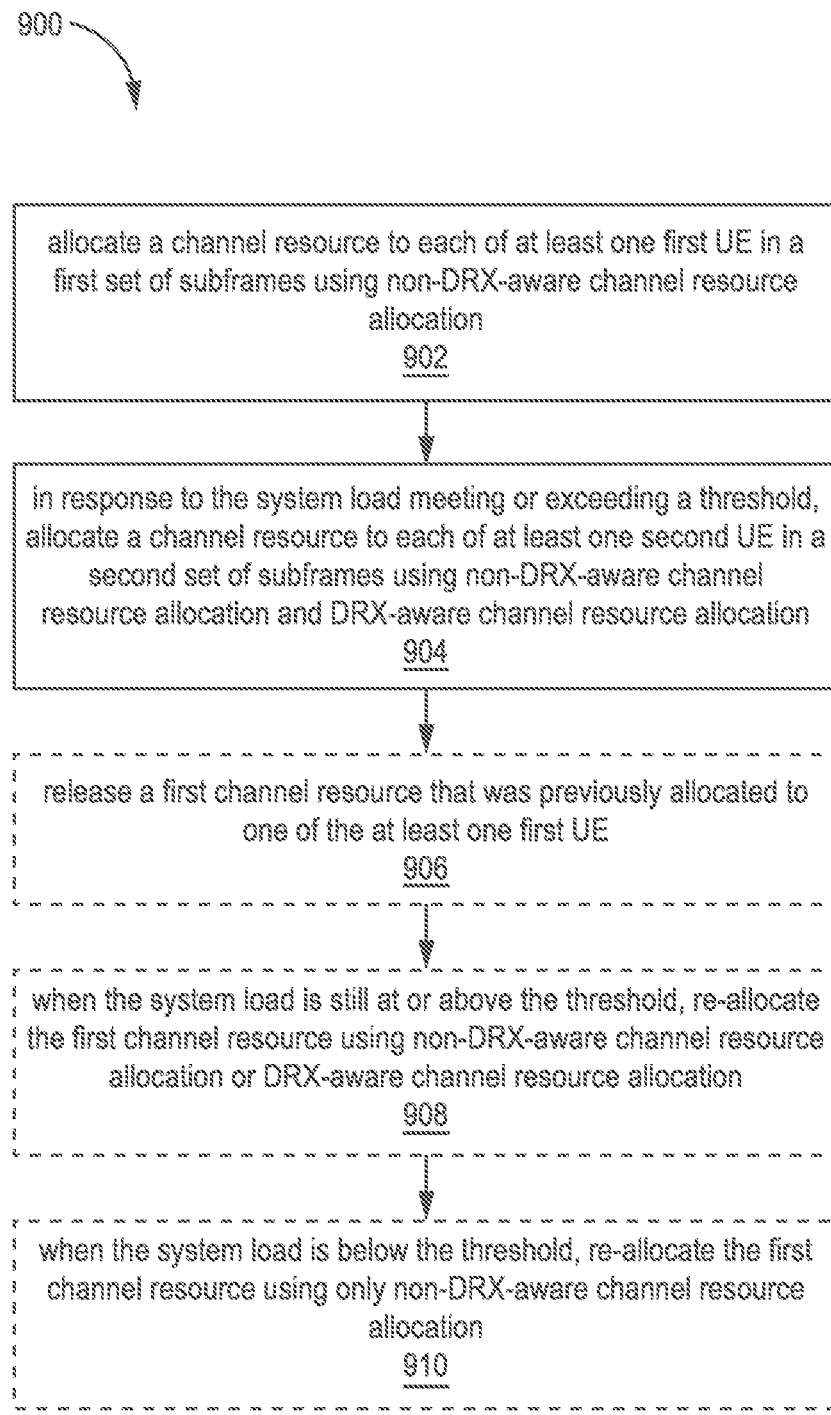
FIG. 9 is a flow diagram illustrating a method for partial DRX-aware channel resource allocation.

FIG. 9 is a flow diagram illustrating a method 900 for partial DRX-aware channel resource allocation. The method 900 may be performed by at least an eNodeB (e.g., implemented by a C-RAN 100). In some examples, the method 900 may be performed, at least partially, by a baseband controller 104 in a C-RAN 100. The eNodeB may provide wireless service to a plurality of UEs 110, at least some of which are DRX-capable and enabled. Optionally, the eNodeB may also provide wireless service to at least one UE 110 that is not DRX-enabled and/or not DRX-capable. For example, the eNodeB may maintain a partial DRX-aware, per-RP PUCCH resource table according to FIG. 6C.

The blocks of the flow diagram shown in FIG. 9 have been arranged in a generally sequential manner for ease of explanation; however, it is to be understood that this arrangement is merely exemplary, and it should be recognized that the processing associated with method 900 (and the blocks shown in FIG. 9) can occur in a different order (for example, where at least some of the processing associated with the blocks is performed in parallel and/or in an event-driven manner). Also, most standard exception handling is not described for ease of explanation; however, it is to be understood that method 900 can and typically would include such exception handling.

The method 900 begins at step 902 where the eNodeB allocates a channel resource (e.g., PUCCH resource) to each of at least one first UE 110 in a first set of subframes using non-DRX-aware channel resource allocation, e.g., as described above. For example, non-DRX-aware channel resource allocation may be exclusively used to allocate channel resources in the first set of subframes until system load equals or exceeds a threshold. System load may be measured as (1) the number of UEs 110 that a single RP 106 is providing wireless service to; (2) the number of UEs 110 that a group of RPs 106 is providing wireless service to; and/or (3) the number of UEs 110 that an eNodeB is providing wireless service to.

The method 900 proceeds to step 904 where, in response to the system load meeting or exceeding a threshold, the eNodeB may allocate a channel resource (e.g., PUCCH resource) to each at least one second UE 110 in a second set of subframes using non-DRX-aware channel resource allocation and DRX-aware channel resource allocation, e.g., as described above.

The method 900 proceeds to optional step 906 where a first channel resource (e.g., PUCCH resource) that was previously allocated to one of the at least one first UE 110 in the first set of subframes is released. For example, the channel resource was previously allocated to a UE 110 that was subsequently released.

The method 900 proceeds to optional step 908 where, when the system load is still at or above the threshold, the eNodeB re-allocates the channel resource using non-DRX-aware channel resource allocation or DRX-aware channel resource allocation. In other words, when the system load is still at or above the threshold, the eNodeB may re-allocate newly freed-up channel resources in the first set of subframes using non-DRX-aware channel resource allocation and/or DRX-aware channel resource allocation.

The method 900 proceeds to optional step 910 where, when the system load is below the threshold, the eNodeB re-allocates the first channel resource (e.g., PUCCH resource) using only non-DRX-aware channel resource allocation.

Advantages

The present systems and methods may include several advantages over conventional techniques channel resource allocation.

First, the present systems and methods may minimize channel resources consumed by all the wireless devices connected to a C-RAN.

Second, the present systems and methods may increase the overall scaling/capacity numbers of the C-RAN, e.g., to enable a C-RAN to provide wireless service more wireless devices.

Third, the present systems and methods may be used to allocate resources for any channel, not only PUCCH. Therefore, even though the description focuses on PUCCH resource management, the present systems and methods are generally applicable to eNodeB scheduling of different channels, e.g., SRS or data channels. Furthermore, the present systems and methods may help in overload management and for striking a good balance between capacity and performance.

Fourth, as PUCCH resources are managed and carefully allocated on per RP-basis and on DRX-basis, the present systems and methods may help avoid overload of the RP-PUCCH channel signal processing function at baseband layer in the RPs 106.

Fifth, as RP-level overloading of the RP-load management function in the baseband controller's 104 L2 processing is avoided (e.g., by managing and allocating the channel resources at the RP-level using the DRX-aware approach), processing and memory resources are conserved at the eNodeB. For example, as the baseband controller's 104 RP-load-management function happens every TTI, those specific CPU resources are freed up, and those resources can be deployed for other TTI-sensitive processing or for scaling the performance of the system.

Sixth, as RP overloading is minimized or avoided, delays/drops at the PUCCH CQI/SR processing are also minimized or avoided, thereby allowing full flexibility for RRM algorithms to adjust the PUCCH CQI/SR periodicities more and dynamically.

Seventh, in the present systems and methods, the overall sector scaling/capacity numbers are targeted, without necessarily giving up on the benefits of the C-RAN 100 smart frequency reuse schemes, which may target the overall sector performance and higher throughput.

Eighth, the present systems and methods are applicable for current LTE standard, as well new LTE-Advanced standard (covering other 3GPP release 10, 11, 12) with features like LTE-TDD, Carrier-Aggregation, Narrowband-Internet Of Things/Category-M1 UE devices support etc. The present systems and methods are also applicable for new 3GPP standards called LTE-NewRadio (shortly called as LTE-NR or simply 5G).

Ninth, in addition to actively managing and minimizing PUCCH channel signaling processing at the eNodeB, the present systems and methods may reduce/minimize processing at the RP 106. Thus averting expensive hardware upgrades, newer board development, etc.

Other Variations

In addition to previously-described variations (e.g., non-PUCCH channels, partial-DRX-aware approach), other variations of the present systems and methods are discussed below.

First, overlapping channel resources (e.g., PUCCH resources) for certain UEs 110 may be permitted in the system, under certain circumstances, even when their CZV-RPs are close/overlapping. For example, at any point in time, the UEs 110 may schedule their transmissions but at different power-levels, thereby avoiding interference between each other. As another example, the UEs 110 may be provided aperiodic CQI opportunities to use PUSCH channel and avoid the overlapping PUCCH resources.

Second, while certain values of DRX-cycle length, PUCCH periodicity length, number of RPs 106, etc. are used herein, the present systems and methods may be generally modified to support various more combinations and the target benefits can be estimated. This may help in preparing lookup tables, which can be used for implementing the proposal in efficient manner.

Third, the present systems and methods doesn't limit supporting different DRX-on periods, PUCCH periodicities, and/or different subCycles for different type of UEs 110 concurrently.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. For example, where a computing device is described as performing an action, the computing device may carry out this action using at least one processor executing instructions stored on at least one memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

The terms "responsive" or "in response to" may indicate that an action is performed completely or partially in response to another action.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks. The transmission medium used by a network may include coaxial cable, fiber optic cable, twisted pair, digital subscriber line (DSL), or combinations thereof. Wireless networks may also use air as a transmission medium.

Also, for the sake of illustration, various configurations of the present disclosure have herein been described in the context of computer programs, physical components, and logical interactions within modern computer networks. Importantly, while these configurations describe various configurations of the present disclosure in relation to modern computer networks and programs, the method and apparatus described herein are equally applicable to other systems, devices, and networks as one skilled in the art will appreciate. As such, the illustrated applications of the configurations of the present disclosure are not meant to be limiting, but instead are examples. Other systems, devices, and networks to which configurations of the present disclosure are applicable include, for example, other types of communication and computer devices and systems. More specifically, configurations are applicable to communication systems, services, and devices such as cell phone networks and compatible devices. In addition, configurations are applicable to all levels of computing from the personal computer to large network mainframes and servers.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The techniques introduced here may be embodied as special-purpose hardware (such as circuitry), as programmable circuitry appropriately programmed with software and/or firmware, or as a combination of special-purpose and programmable circuitry. Hence, configurations may include a machine-readable medium (also referred to as a computer-readable medium) having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. The machine-readable medium may be tangible and non-transitory.

In conclusion, the present disclosure provides novel systems, methods, and arrangements for channel resource (e.g., PUCCH resource) allocation a C-RAN. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

EXAMPLE EMBODIMENTS

Example 1 includes a communication system for performing non-DRX-aware channel resource allocation, comprising: a plurality of radio points (RPs), each configured to exchange radio frequency (RF) signals with a plurality of user equipment (UEs) at a site; a baseband controller communicatively coupled to the plurality of radio points, wherein the baseband controller is configured to: determine, for each RP communicating with a UE, available channel resources in each of a plurality of subframes; determine a least-loaded subframe that has the most available channel resources; and assign an available channel resource in the least-loaded subframe to the UE.

Example 2 includes the communication system of Example 1, wherein the baseband controller is further configured to assign the available channel resource, in the least-loaded subframe, to the UE for each RP communicating with the UE.

Example 3 includes the communication system of any of Examples 1-2, wherein the baseband controller is further configured to determine the available channel resources in response to the UE attaching to the communication system.

Example 4 includes the communication system of any of Examples 1-3, wherein the UE, which has previously attached to the communication system, moves across a coverage site of the communication system such that at least one RP communicating with the UE changes.

Example 5 includes the communication system of Example 4, wherein the baseband controller is further configured to: for each RP communicating with the UE after the UE moves across the coverage site, determine the available channel resources in each of the plurality of subframes; release a channel resource that was previously-allocated to the UE on each RP that was previously communicating with the UE before the UE moves across the coverage site; determine a new subframe, within the plurality of subframes, with the most available channel resources across all the RPs communicating with the UE; and assign a new channel resource in the new subframe to the UE.

Example 6 includes the communication system of Example 5, wherein the baseband controller determines which RPs transmit to the UE based on whether each RP receives a transmission from the UE with a signal metric that exceeds a threshold or drops below the threshold.

Example 7 includes the communication system of Example 6, wherein the baseband controller is further configured to assign the new channel resource, in the new subframe, to the UE for each RP communicating with the UE after the UE moves across the coverage site of the communication system.

Example 8 includes the communication system of any of Examples 1-7, wherein the channel resources are Physical Uplink Control Channel (PUCCH) resources.

Example 9 includes the communication system of Example 8, wherein each PUCCH resource is defined by at least: a particular subframe within a system frame; a physical resource block (PRB) within the particular subframe; and a cyclic shift.

Example 10 includes the communication system of Example 9, wherein each PUCCH resource is further defined by an orthogonal sequence used in the PRB.

Example 11 includes a method for non-DRX-aware channel resource allocation in a communication system, the communication system comprising a baseband controller and a plurality of radio points, wherein each radio point is configured to exchange radio frequency (RF) signals with a plurality of user equipment (UEs), the method comprising: determining, for each RP communicating with a UE, available channel resources in each of a plurality of subframes; determining a least-loaded subframe that has the most available channel resources; and assigning an available channel resource in the least-loaded subframe to the UE.

Example 12 includes the method of Example 11, wherein the assigning the available channel resource comprises assigning the available channel resource, in the least-loaded subframe, to the UE for each RP communicating with the UE.

Example 13 includes the method of any of Examples 11-12, wherein the determining the available channel resources is performed in response to the UE attaching to the communication system.

Example 14 includes the method of any of Examples 11-13, wherein the UE, which has previously attached to the communication system, moves across a coverage site of the communication system such that at least one RP communicating with the UE changes.

Example 15 includes the method of Example 14, further comprising: for each RP communicating with the UE after the UE moves across the coverage site, determining the available channel resources in each of the plurality of subframes; releasing a channel resource that was previously-allocated to the UE on each RP that was previously communicating with the UE before the UE moves across the coverage site; determining a new subframe, within the plurality of subframes, with the most available channel resources across all the RPs communicating with the UE; and assigning a new channel resource in the new subframe to the UE.

Example 16 includes the method of Example 15, further comprising determining which RPs transmit to the UE based on whether each RP receives a transmission from the UE with a signal metric that exceeds a threshold or drops below the threshold.

Example 17 includes the method of Example 16, wherein the assigning the new channel resource comprises assigning the new channel resource, in the new subframe, to the UE for each RP communicating with the UE after the UE moves across the coverage site of the communication system.

Example 18 includes the method of any of Examples 11-17, wherein the channel resources are Physical Uplink Control Channel (PUCCH) resources.

Example 19 includes the method of Example 18, wherein each PUCCH resource is defined by: a particular subframe within a system frame; a physical resource block (PRB) within the particular subframe; and a cyclic shift.

Example 20 includes the method of Example 19, wherein each PUCCH resource is further defined by an orthogonal sequence used in the PRB.

Example 21 includes a communication system for performing DRX-aware channel resource allocation, comprising: a plurality of radio points (RPs), each configured to exchange radio frequency (RF) signals with a plurality of user equipment (UEs); a baseband controller communicatively coupled to the plurality of radio points, wherein the baseband controller is configured to: reallocate a second UE's channel resource in a first UE's DRX subcycle, for RPs in a first UE's combining zone vector (CZV), from a second UE to a first UE, wherein the first UE's CZV matches the second UE's CZV.

Example 22 includes the communication system of Example 21, wherein the first UE is assigned to a first DRX subcycle, wherein the second UE is assigned to a second DRX subcycle.

Example 23 includes the communication system of Example 22, wherein the reallocating comprises: determining that the second UE's channel resource is reserved, for the RPs in the first UE's CZV, in all DRX subcycles; releasing the second UE's channel resource, for the RPs in the first UE's CZV, in all DRX subcycles except the second UE's DRX subcycle; and allocating the second UE's channel resource in the first UE's DRX subcycle, for the RPs in the first UE's CZV, to the first UE.

Example 24 includes the communication system of any of Examples 21-23, wherein the baseband controller is further configured to trigger DRX-aware channel resource allocation for the first UE.

Example 25 includes the communication system of Example 24, wherein the DRX-aware channel resource allocation is triggered in response to at least one of: an RP in the communication system reaching or exceeding a threshold number of UEs it can serve; a group of RPs in the communication system reaching or exceeding a threshold number of UEs the group can serve; and a DRX-enabled UE attaching to the eNodeB or moving within a coverage site of the communication system to which it has previously attached.

Example 26 includes the communication system of any of Examples 21-25, wherein the baseband controller is configured to determine which RPs are in the first UE's CZV based on whether each RP receives a transmission from the first UE with a signal metric that exceeds a threshold or drops below the threshold.

Example 27 includes the communication system of any of Examples 21-26, wherein the baseband controller is further configured to: search for a channel resource that is available on all the DRX subcycles for the RPs in a first UE's combining zone vector (CZV); and when the search for the channel resource is unsuccessful: reallocate the second UE's channel resource in the first UE's DRX subcycle to the first UE; and release the second UE's channel resource in at least one additional DRX subcycle that is different than the first UE's DRX subcycle and the second UE's DRX subcycle.

Example 28 includes the communication system of Example 27, wherein the baseband controller is further configured to, when the search for the channel resource is successful, assign the channel resource to the first UE on all the DRX subcycles for the RPs in the first UE's CZV.

Example 29 includes the communication system of Example 28, wherein each PUCCH resource is defined by: a particular subframe within a system frame; a physical resource block (PRB) within the particular subframe; and a cyclic shift.

Example 30 includes the communication system of Example 29, wherein each PUCCH resource is further defined by an orthogonal sequence used in the PRB.

Example 31 includes a method for DRX-aware channel resource allocation in a communication system, the communication system comprising a baseband controller and a plurality of radio points (RPs), wherein each radio point is configured to exchange radio frequency (RF) signals with a plurality of user equipment (UEs), the method comprising: reallocating a second UE's channel resource in a first UE's DRX subcycle, for RPs in a first UE's combining zone vector (CZV), from a second UE to the first UE, wherein the first UE's CZV matches the second UE's CZV.

Example 32 includes the method of Example 31, wherein the first UE is assigned to a first DRX subcycle, wherein the second UE is assigned to a second DRX subcycle.

Example 33 includes the method of Example 32, wherein the reallocating comprises: determining that the second UE's channel resource is reserved, for the RPs in the first UE's CZV, in all DRX subcycles; releasing the second UE's channel resource, for the RPs in the first UE's CZV, in all DRX subcycles except the second UE's DRX subcycle; and allocating the second UE's channel resource in the first UE's DRX subcycle, for the RPs in the first UE's CZV, to the first UE.

Example 34 includes the method of any of Examples 31-33, further comprising triggering DRX-aware channel resource allocation for the first UE.

Example 35 includes the method of Example 34, further comprising triggering the DRX-aware channel resource allocation in response to at least one of: an RP in the communication system reaching or exceeding a threshold number of UEs it can serve; a group of RPs in the communication system reaching or exceeding a threshold number of UEs the group can serve; and a DRX-enabled UE attaching to the eNodeB or moving within a coverage site of the communication system to which it has previously attached.

Example 36 includes the method of any of Examples 31-35, further comprising determining which RPs are in the first UE's CZV based on whether each RP receives a transmission from the first UE with a signal metric that exceeds a threshold or drops below the threshold.

Example 37 includes the method of any of Examples 31-36, further comprising: searching for a channel resource that is available on all the DRX subcycles for the RPs in a first UE's combining zone vector (CZV); and when the search for the channel resource is unsuccessful: reallocate the second UE's channel resource in the first UE's DRX subcycle to the first UE; and release the second UE's channel resource in at least one DRX subcycle that is different than the first UE's DRX subcycle and the second UE's DRX subcycle Example 38 includes the method of Example 37, further comprising, when the search for the channel resource is successful, assigning the channel resource to the first UE on all the DRX subcycles for the RPs in the first UE's CZV.

Example 39 includes the method of Example 38, wherein each PUCCH resource is defined by: a particular subframe within a system frame; a physical resource block (PRB) within the particular subframe; and a cyclic shift.

Example 40 includes the method of any of Examples 31-39, wherein each PUCCH resource is further defined by an orthogonal sequence used in the PRB.

Example 41 includes a communication system for performing partial DRX-aware channel resource allocation, comprising: a plurality of radio points (RPs), each configured to exchange radio frequency (RF) signals with a plurality of user equipment (UEs); a baseband controller communicatively coupled to the plurality of radio points, wherein the baseband controller is configured to: allocate a channel resource to each of at least one first UE in a first set of subframes using non-DRX-aware channel resource allocation; and in response to the system load meeting or exceeding a threshold, allocate a channel to each at least one second UE in a second set of subframes using non-DRX-aware channel resource allocation and DRX-aware channel resource allocation.

Example 42 includes the communication system of Example 41, wherein the baseband controller is further configured to release a first channel resource previously allocated to one of the at least one first UE.

Example 43 includes the communication system of Example 42, wherein the baseband controller is further configured to, when the system load is still at or above the threshold, re-allocate the channel resource using non-DRX-aware channel resource allocation or DRX-aware channel resource allocation.

Example 44 includes the communication system of any of Examples 42-43, wherein the baseband controller is further configured to, when the system load is below the threshold, re-allocate the first channel resource using only non-DRX-aware channel resource allocation.

Example 45 includes a method for partial DRX-aware channel resource allocation in a communication system, the communication system comprising a baseband controller and a plurality of radio points (RPs), wherein each radio point is configured to exchange radio frequency (RF) signals with a plurality of user equipment (UEs), the method comprising: allocating a channel resource to each of at least one first UE in a first set of subframes using non-DRX-aware channel resource allocation; and in response to the system load meeting or exceeding a threshold, allocating a channel to each at least one second UE in a second set of subframes using non-DRX-aware channel resource allocation and DRX-aware channel resource allocation.

Example 46 includes the method of Example 45, further comprising releasing a first channel resource previously allocated to one of the at least one first UE.

Example 47 includes the method of Example 46, further comprising, when the system load is still at or above the threshold, re-allocating the channel resource using non-DRX-aware channel resource allocation or DRX-aware channel resource allocation.

Example 48 includes the method of any of Examples 46-47, further comprising, when the system load is below the threshold, re-allocating the first channel resource using only non-DRX-aware channel resource allocation.

The invention claimed is:

1. A distributed base station for performing non-DRX-aware channel resource allocation, comprising:
   a plurality of radio points (RPs), each configured to exchange radio frequency (RF) signals with a plurality of user equipment (UEs) at a site; and
   a baseband controller physically separated from and communicatively coupled to the plurality of radio points via a switched Ethernet network, wherein the baseband controller is configured to:
      determine, for each of multiple RPs communicating with a UE, available channel resources in each of a plurality of subframes;
      determine a least-loaded subframe that has the most available channel resources among the multiple RPs communicating with the UE; and
      assign an available channel resource in the least-loaded subframe to the UE for each of the multiple RPs communicating with the UE, wherein one or more channel resources are reused for different UEs across different RPs located in different geographical locations.

2. The distributed base station of claim 1, wherein the baseband controller is further configured to assign the available channel resource, in the least-loaded subframe, to the UE for each RP communicating with the UE.

3. The distributed base station of claim 1, wherein the baseband controller is further configured to determine the available channel resources in response to the UE attaching to the distributed base station.

4. The distributed base station of claim 1, wherein the UE, which has previously attached to the distributed base station, moves across a coverage site of the distributed base station such that at least one RP communicating with the UE changes.

5. The distributed base station of claim 4, wherein the baseband controller is further configured to:
   for each of the multiple RPs communicating with the UE after the UE moves across the coverage site, determine the available channel resources in each of the plurality of subframes;
   release a channel resource that was previously-allocated to the UE on each of the multiple RPs that were previously communicating with the UE before the UE moves across the coverage site;
   determine a new subframe, within the plurality of subframes, with the most available channel resources across all the RPs communicating with the UE; and
   assign a new channel resource in the new subframe to the UE.

6. The distributed base station of claim 5, wherein the baseband controller determines which RPs transmit to the UE based on whether each of the plurality of RPs receives a transmission from the UE with a signal metric that exceeds a threshold or drops below the threshold.

7. The distributed base station of claim 6, wherein the baseband controller is further configured to assign the new channel resource, in the new subframe, to the UE for each of the plurality of RPs communicating with the UE after the UE moves across the coverage site of the distributed base station.

8. The distributed base station of claim 1, wherein the channel resources are Physical Uplink Control Channel (PUCCH) resources.

9. The distributed base station of claim 8, wherein each PUCCH resource is defined by at least:
   a particular subframe within a system frame;
   a physical resource block (PRB) within the particular subframe; and
   a cyclic shift.

10. The distributed base station of claim 9, wherein each PUCCH resource is further defined by an orthogonal sequence used in the PRB.

11. A method for non-DRX-aware channel resource allocation in a distributed base station, the distributed base station comprising a baseband controller that is physically separated from a plurality of radio points via a switched Ethernet network, wherein each radio point is configured to exchange radio frequency (RF) signals with a plurality of user equipment (UEs), the method comprising:
   determining, for each of multiple RPs communicating with a UE, available channel resources in each of a plurality of subframes;
   determining a least-loaded subframe that has the most available channel resources among the multiple RPs communicating with the UE; and
   assigning an available channel resource in the least-loaded subframe to the UE for each of the multiple RPs communicating with the UE, wherein one or more channel resources are reused for different UEs across different RPs located in different geographical locations.

12. The method of claim 11, wherein the assigning the available channel resource comprises assigning the available channel resource, in the least-loaded subframe, to the UE for each RP communicating with the UE.

13. The method of claim 11, wherein the determining the available channel resources is performed in response to the UE attaching to the distributed base station.

14. The method of claim 11, wherein the UE, which has previously attached to the distributed base station, moves across a coverage site of the distributed base station such that at least one RP communicating with the UE changes.

15. The method of claim 14, further comprising:
   for each of multiple RPs communicating with the UE after the UE moves across the coverage site, determining the available channel resources in each of the plurality of subframes;

releasing a channel resource that was previously-allocated to the UE on each of the multiple RPs that were previously communicating with the UE before the UE moves across the coverage site;

determining a new subframe, within the plurality of subframes, with the most available channel resources across all the RPs communicating with the UE; and assigning a new channel resource in the new subframe to the UE.

16. The method of claim 15, further comprising determining which RPs transmit to the UE based on whether each of the plurality of RPs receives a transmission from the UE with a signal metric that exceeds a threshold or drops below the threshold.

17. The method of claim 16, wherein the assigning the new channel resource comprises assigning the new channel resource, in the new subframe, to the UE for each of the multiple RPs communicating with the UE after the UE moves across the coverage site of the distributed base station.

18. The method of claim 11, wherein the channel resources are Physical Uplink Control Channel (PUCCH) resources.

19. The method of claim 18, wherein each PUCCH resource is defined by:
   a particular subframe within a system frame;
   a physical resource block (PRB) within the particular subframe; and
   a cyclic shift.

20. The method of claim 19, wherein each PUCCH resource is further defined by an orthogonal sequence used in the PRB.

21. The distributed base station of claim 1, wherein the plurality of RPs are physically separated from each other.

* * * * *